United States Patent [19]

Evans et al.

[11] Patent Number: 4,564,915

[45] Date of Patent: Jan. 14, 1986

[54] YIQ COMPUTER GRAPHICS SYSTEM

[75] Inventors: Lawrence J. Evans, Los Gatos; Junaid Sheikh, Fremont; Rodney D. Stock, Palo Alto; Kenneth E. J. Turkowski, San Carlos, all of Calif.

[73] Assignee: Ampex Corporation, Redwood City, Calif.

[21] Appl. No.: 353,373

[22] Filed: Mar. 1, 1982

Related U.S. Application Data

[63] Continuation of Ser. No. 139,590, Apr. 11, 1980, abandoned.

[51] Int. Cl.$^4$ .................. G06F 3/153; G06F 15/20
[52] U.S. Cl. ........................... 364/521; 340/701; 358/75; 358/903
[58] Field of Search .............. 364/515, 521; 358/4, 358/9, 16, 75, 77, 80, 903; 340/701, 707, 724, 731

[56] References Cited

U.S. PATENT DOCUMENTS

| | | | |
|---|---|---|---|
| 3,293,614 | 12/1966 | Fenimore et al. | 340/172.5 |
| 3,555,523 | 1/1971 | Sieracki et al. | 340/173 |
| 3,573,855 | 4/1971 | Cragon et al. | 340/172.5 |
| 3,697,678 | 10/1972 | Belleson | 178/6.6 DD |
| 3,789,367 | 1/1974 | Dumstroff et al. | 340/172.5 |
| 3,811,113 | 5/1974 | Saito et al. | 340/172.5 |
| 3,849,594 | 11/1974 | Justice | 178/5.6 |

(List continued on next page.)

FOREIGN PATENT DOCUMENTS

| | | |
|---|---|---|
| 0004010A | 9/1979 | European Pat. Off. |
| 2636788 | 2/1978 | Fed. Rep. of Germany. |
| 2836500 | 3/1980 | Fed. Rep. of Germany. |
| 1437795 | 6/1976 | United Kingdom. |
| 1508909 | 4/1978 | United Kingdom. |
| 1522098 | 8/1978 | United Kingdom. |
| 2018085A | 10/1979 | United Kingdom. |
| 2017459A | 10/1979 | United Kingdom. |
| 2030029A | 3/1980 | United Kingdom. |
| 2030419A | 4/1980 | United Kingdom. |
| 2033692A | 5/1980 | United Kingdom. |
| 2047042A | 11/1980 | United Kingdom. |
| 2063004A | 5/1981 | United Kingdom. |

OTHER PUBLICATIONS

D. E. Pearson, *Transmission and Display of Pictorial Information*, John Wiley & Sons, 1975, pp. 1–14 and 168–173.

Alvy Ray Smith, "Color Gamut Transform Pairs", *Computer Graphics*, vol. 12, No. 3, pp. 12–19 (Aug. 1978).

(List continued on next page.)

*Primary Examiner*—Joseph Ruggiero
*Assistant Examiner*—Gary V. Harkcom
*Attorney, Agent, or Firm*—Gregory Roth; Bradley A. Perkins; Joel D. Talcott

[57] ABSTRACT

A YIQ computer graphics system includes a data processing system having a data tablet for receiving inputs from an artist and a video processing system connected to the data processing system. The video processing system includes a two component expandable frame store with the first component storing video intensity information for each pixel of a visual image and with the second component storing two video color components each for one-half of the visual image. The video processing system further includes a memory controller coupled to receive pixel address information identifying pixel locations within a row and column matrix of pixel locations containing the visual image and addressing specific locations within the frame store in response thereto, an interface circuit coupled to transfer video data between the frame store and the data processing system at pixel locations within a matrix of locations defined by the data processing system, and a video output processor coupled to provide matrix address locations to the frame store and receive in return video data from the frame store to generate a color video output signal in raster scan order. The video processing system may also include an input scanner coupled to write into the frame store video information on a continuous frame-by-frame basis to permit the video output processor to output a video signal which indicates a continuously changing video image on a frame-by-frame real time basis.

37 Claims, 10 Drawing Figures

U.S. PATENT DOCUMENTS

| | | | |
|---|---|---|---|
| 3,976,982 | 8/1976 | Eiselen | 340/172.5 |
| 4,002,827 | 1/1977 | Nevin et al. | 343/5 SC |
| 4,017,680 | 4/1977 | Anderson et al. | 348/242 |
| 4,026,555 | 5/1977 | Kirschner et al. | 273/85 R |
| 4,093,996 | 6/1978 | Hogan et al. | 364/900 |
| 4,117,473 | 9/1978 | Habeger, Jr. et al. | 340/324 AD |
| 4,120,028 | 10/1978 | Membrino et al. | 364/200 |
| 4,121,283 | 10/1978 | Walker | 364/200 |
| 4,124,871 | 11/1978 | Morrin, II | 358/287 |
| 4,129,859 | 12/1978 | Iwamura | 340/324 AD |
| 4,134,131 | 1/1979 | Hopkins, Jr. | 358/149 |
| 4,148,070 | 4/1979 | Taylor | 358/160 |
| 4,149,152 | 4/1979 | Russo | 340/703 |
| 4,156,914 | 5/1979 | Westell | 364/515 |
| 4,158,838 | 6/1979 | Pruznick et al. | 340/750 |
| 4,163,249 | 7/1979 | Michael et al. | 358/21 R |
| 4,183,058 | 1/1980 | Taylor | 358/127 |
| 4,189,743 | 2/1980 | Schure et al. | 358/93 |
| 4,189,744 | 2/1980 | Stern | 358/93 |
| 4,197,590 | 4/1980 | Sukonick et al. | 364/900 |
| 4,200,867 | 4/1980 | Hill | 340/703 |
| 4,200,869 | 4/1980 | Marayama et al. | 340/723 |
| 4,204,208 | 5/1980 | McCarthy | 340/745 |
| 4,206,457 | 6/1980 | Weisbecker et al. | 340/703 |
| 4,209,832 | 6/1980 | Gilham et al. | 364/521 |
| 4,225,861 | 9/1980 | Langdon, Jr. et al. | 340/703 |
| 4,232,311 | 11/1980 | Agneta | 340/703 |
| 4,280,138 | 7/1981 | Stock | 358/150 |

OTHER PUBLICATIONS

Shoup, Richard G., "Color Table Animation", *Computer Graphics,* vol. 13, No. 2, pp. 8-13 (Aug. 1979).

H. K. Regnier and L. J. Evans, "Interactive Computer Graphics in the Broadcast Environment", *IEEE Conf. Pub. 166,* pp. 236-243 (1978).

Michael Housing, "Videograph-A Flexible Component System for Television Picture Synthesis", *NTG-Fachberichte,* vol. 67, pp. 183-193 (Mar. 13-15, 1979).

D. Meyer-Ebrecht and R. Weissel, "The Integrated Picture Processing/Picture Bank System PICASSO", *NTG-Fachberichte,* vol. 67, pp. 246-253, (Mar. 13-15, 1979).

FRAME STORE 50

PICTURE ADDRESS TRANSFORM INTERFACE 48

FIG.7 DATA BUFFER 192

VIDEO OUTPUT PROCESSOR 42

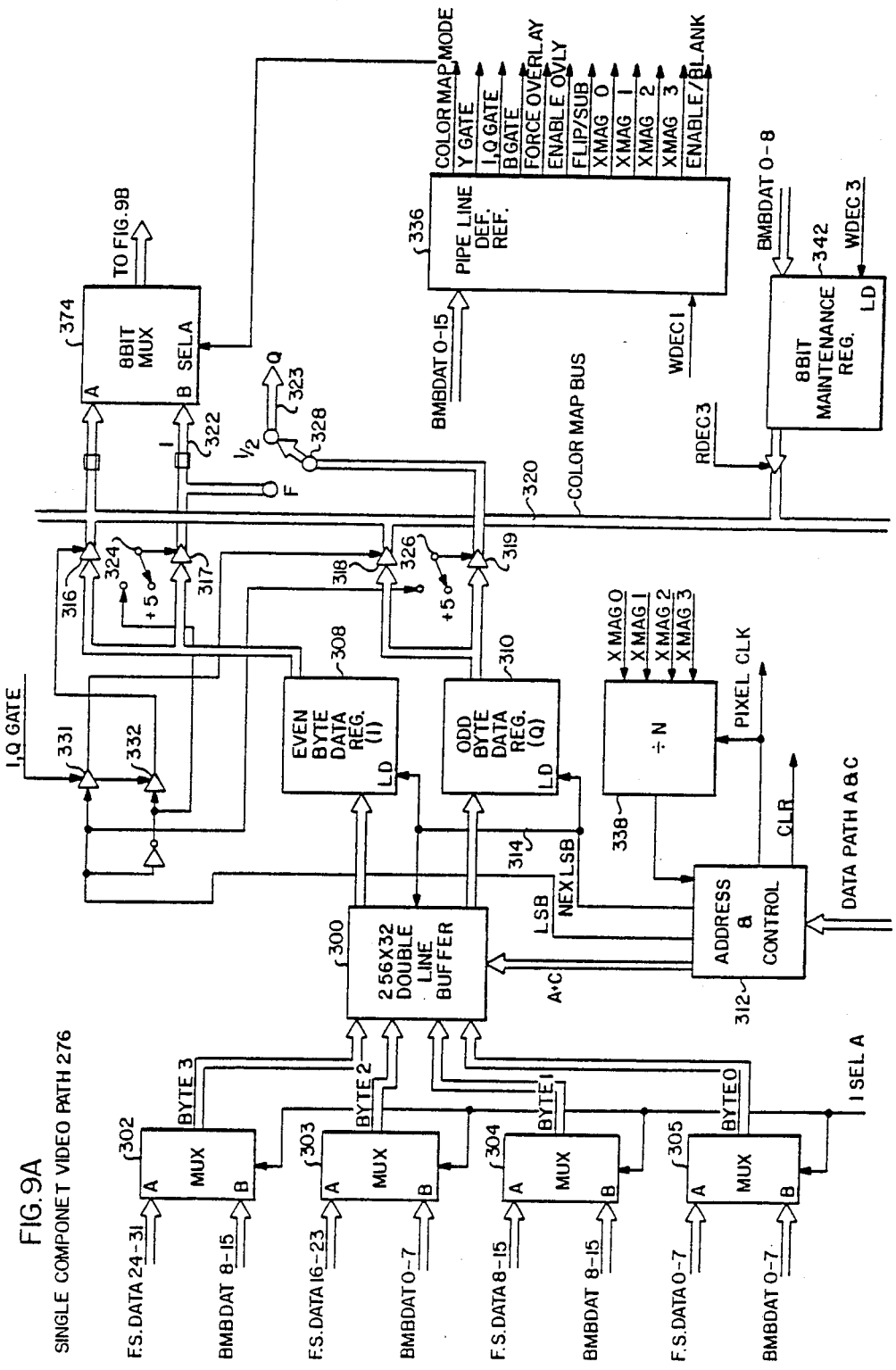

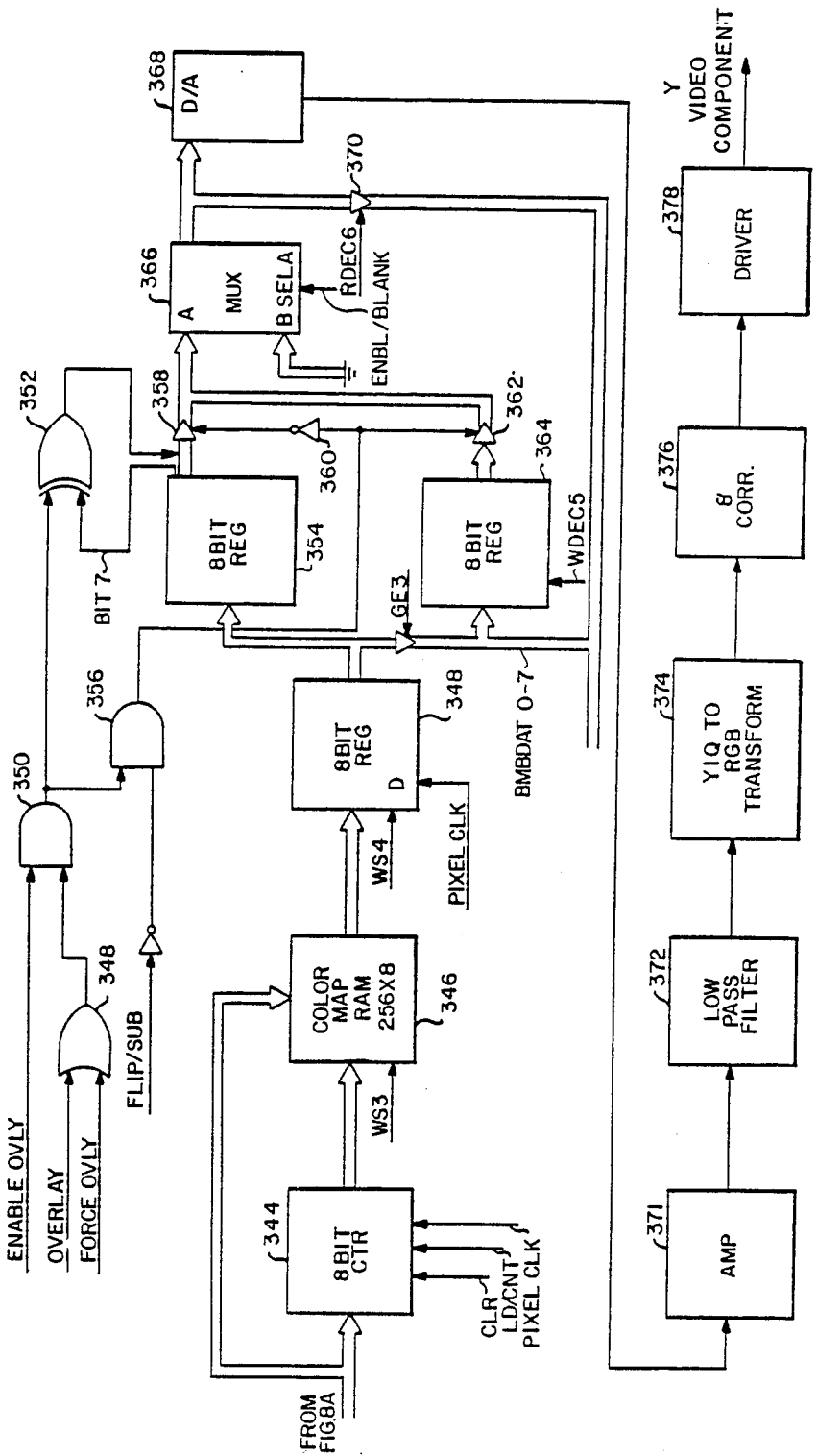
FIG. 9B SINGLE COMPONENT VIDEO DATA PATH 276

YIQ COMPUTER GRAPHICS SYSTEM

CROSS REFERENCE TO RELATED APPLICATIONS

This is a continuation of application Ser. No. 139,590 filed Apr. 11, 1980 abandoned.

BACKGROUND OF THE INVENTION

1. Field of the Invention

This invention relates to computer graphic systems and particularly to computer graphic systems providing color television raster scan video signals as an output.

2. Discussion of the Prior Art

Raster scan video graphic systems have an advantage over vector display types of graphic systems in that they can produce much more complex graphic images which include multicolor areas shading and blending. However, to achieve this flexibility a raster scan system must process a huge number of picture elements or pixels corresponding to individually sampled points within a row and column pixel matrix for each frame of a visual image. In such a system a frame store is typically provided to store a byte of information for each pixel of a video image. Such frame stores are extremely large and expensive. In some systems the three color components of a visual image are stored within the single byte of storage capacity for each pixel location. This results in an unsatisfactory video image with poor definition of color and intensity throughout the image.

In other systems known as color map systems a second, much smaller color map memory is provided which is addressed by the one byte of video information at each pixel location of the frame store memory. The color map memory has a typical configuration of 256 words×24 bits. The 24 bits permit one 8 bit byte of resolution for each of three primary components of a color video signal. The artist is then able to store one of 256 colors at each color map address location and then store a byte of data identifying one of these color defining locations at each pixel location within the frame store. Such an arrangement is capable of producing a high quality video image but is limited in that it is limited to 256 preselected colors out of a combination of millions of possible colors which can be distinguished on a television video display. The limitation of 256 predefined colors is not sufficient to permit general low pass filtering of television quality complex pictures.

Various examples of raster scan data graphic systems are disclosed by the following U.S. Pat. Nos. 4,093,996; 4,117,473; 4,129,859; 4,156,914; 4,158,838; 4,189,743; and 4,189,744.

SUMMARY OF THE INVENTION

A computer graphic system in accordance with the invention includes a data processing system coupled to receive graphic input commands from an artist and a video processing system coupled to the data processing system. The video processing system stores video information in a three component video format in which one component, the video intensity signal, is stored with a full dynamic range and at a full spatial resolution and two color defining components are each stored with a full dynamic range but have half the spatial resolution of the video intensity signal component. That is, the intensity component is defined at two pixel locations for each single pixel location of the color component signals. The two color component signals thus have in combination the same effective bandwidth as the single intensity component signal.

The video processing system includes an expandable or contractable frame store, a memory controller coupled to convert X, Y coordinate matrix addresses into hardware frame store component addresses, an interface circuit coupling the video processor to the data processor, and a video output processor coupled to read frames of data from the frame store and generate a full color video signal with a format that is acceptable by video display device such as a color video monitor or a television set in response thereto.

The frame store stores video information for each pixel in a coordinate matrix of pixels for a visual display and has a first frame store component storing intensity information for each pixel of the visual display with a given resolution and a second component store storing color defining information for two color components of the visual display. Each of the color components are defined with full dynamic range but are sampled at only half of the pixel locations of a visual display and are stored at alternating pixel locations of the second frame store component to facilitate synchronized, equal bandwidth processing of the contents of the two frame store components.

A flexible hardware architecture permits the video graphic system to be upgraded in sequential steps from a simple color map system to a YIQ full color double frame store component system and to a red, green, blue full color resolution triple frame store component system by merely adding memory storage capacity and making minor adjustments and without having to discard expensive components used in the lower grade systems.

DETAILED DESCRIPTION OF THE DRAWINGS

A better understanding of the invention may be had from a consideration of the following detailed description taken in conjunction with the accompanying drawings in which:

FIGS. 9A and 9B are a block diagram and schematic representation of a single component video data path for the video output processor shown in FIG. 8.

DETAILED DESCRIPTION

Figure 1:
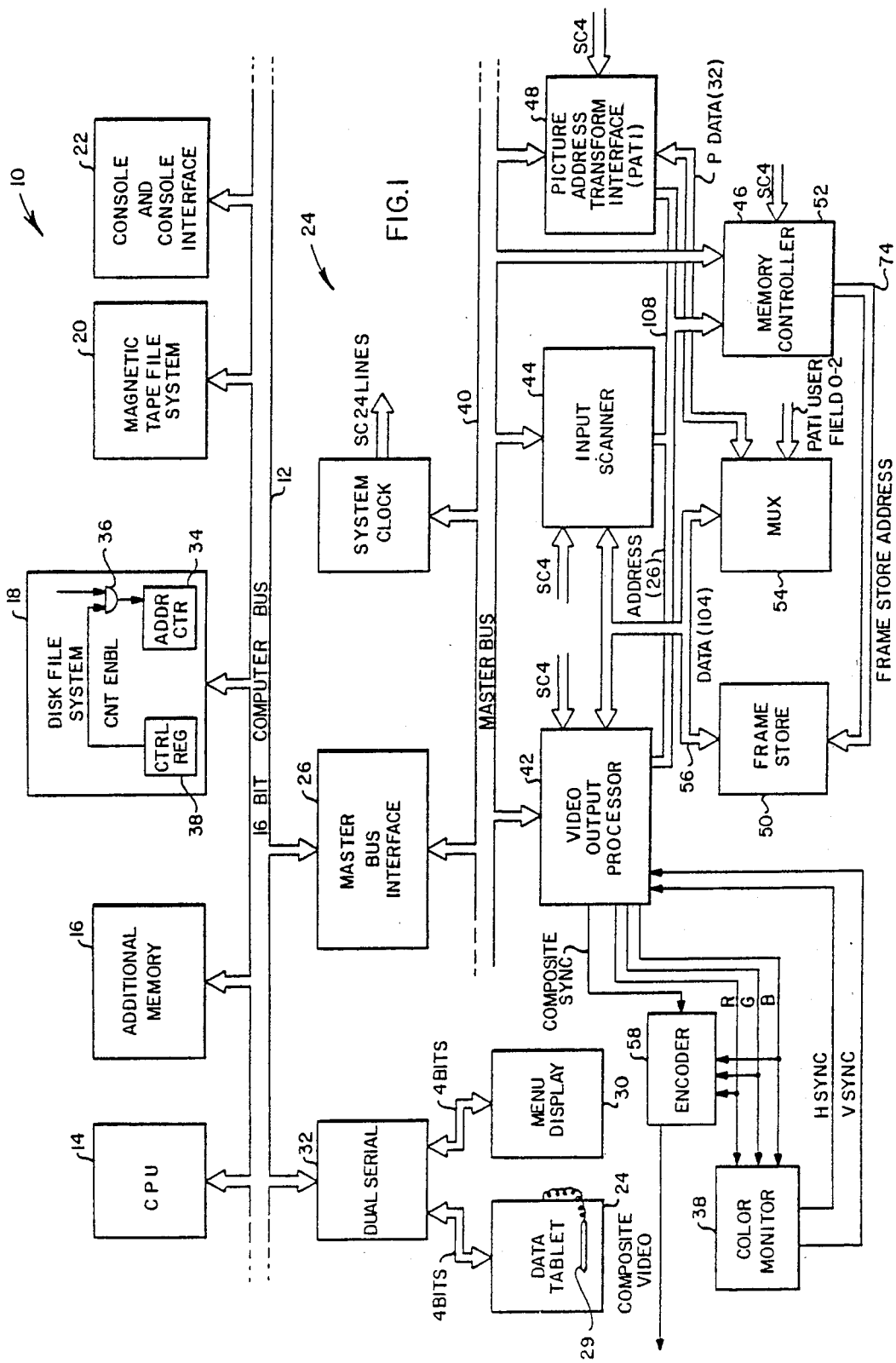
FIG. 1 is a block diagram representation of a computer graphic system in accordance with the invention.

Referring now to FIG. 1, a raster scan computer graphics system 10 which is advantageously configured for YIQ color representation includes a computer bus 12 having a central processing unit 14 such as a Digital Equipment Corporation PDP 11/34 connected thereto. Computer components connected to the computer bus 12 include additional random access memory 16, a disk file system 18, a magnetic tape file system 20, and a console and console interface 22. A video processing system 24 is connected to computer bus 12 through a Master Bus interface 26 while a data tablet 28 and a menu display 30 are connected to computer bus 12 through a 38.2 kilobaud dual serial interface 32. Other computer peripherals may be coupled to the computer bus 12 if desired. The computer peripherals such as additional memory 16, disk file system 18, magnetic tape file system 20 and console 22 may be of conventional construction except that a minor modification is required for any unit which is to be capable of making a block access, i.e. a high speed continuous string of serial words or bytes, to the video processing system 24. In a conventional DMA type of block access an address counter such as address counter 34 within a master unit such as disk file system 18 is set to a desired beginning address and then incremented for each read or write word transferred until a specified number of words are transferred over the computer bus. However, the video processing system 24 has a special block access mode in which all data words of a block transfer must be presented to an addressable address location identifying a component of the frame store while the video processing system itself accesses a prearranged X, Y address location and automatically increments the address for the prearranged location for each word transfer. It is apparent that the computer bus master must continuously address the frame store component access location and not increment the address placed on the computer bus. This is accomplished by connecting a count enable input for address counter 34 through an AND gate 36 which may be selectively enabled by a bit position within an addressable control register 38. A similar modification may be provided for any computer bus 12 device which is to become a bus master for a block mode read or write data exchange with the video processing system 24.

Data tablet 28 is preferably a coordinate matrix device which senses the location of a pen in an X-Y orthogonal coordinate system. A data pen 29 contains a pressure sensitive microswitch to provide on-off Z axis information. The data tablet 28 preferably has two adjacent areas, a first corresponding to a color monitor 38 within video processing system 24 and the second corresponding to menu display 30. Upon touching the pen within one of the display areas, a display cursor provides visual feedback to an operator as to the location of the pen within the coordinate system.

The menu display is preferably arranged to provide mode control for the computer graphic system 10. For example, a plurality of available modes may be displayed on menu display 30 and one of the modes may be selected by moving the pen to a tablet location corresponding to the mode display location as indicated by the cursor displayed on menu display 30 and activating the microswitch at that location. It will be appreciated that selection of a given mode can lead to the subsequent display and selection of submodes. For example, the modes might include such things as painting, draw, clear, fill, tint fill, letter task, save picture, recall picture, select brush, design brush, design palette, recall palette, store sequence, and recall sequence. An example of a submode might result when an operator selects the recall brush mode, causing a previously designated selection of brush shapes to be displayed with one of the brush shapes being selected by depressing the pen 29 while positioned at the brush shape as previously described. Thereafter, movement of the pen within the monitor display area of tablet 28 will cause the painting on color monitor 38 of areas corresponding to pen movement as if the pen had the shape of the selected brush. Other functions may of course be selected since CPU 14 has essentially complete control over each picture element or pixel displayed on color monitor 38.

The Master Bus interface 26 provides a connection between computer bus 12 and a Master Bus 40 for the video processing system 24. The Master Bus 40 includes 16 data lines, 18 address lines, and 16 control lines which permit the Master Bus 40 to become in effect an extension of the computer bus 12 which permits computer bus masters to have direct addressable access to major components of the video processing system 24 such as a video output processor 42 and input scanner 44, a memory controller 52, and a picture address transform interface (PATI) 48.

An encoder 58 may be provided as an optional device to read the red, green, blue video color signals from video output processor 42 and generate a composite video television signal.

The heart of the video processing system portion 24 of raster scan computer graphics system 10 is a modularly expandable frame store 50. Frame store 50 contains what would be considered in a conventional graphics system 1, 2 or 3 separate frame stores as well as a 1 bit deep overlay store. While each of the component stores of the frame store is implemented with $16K \times 1$ bit memory chips, a memory controller 52 provides an address transformation such that each pixel of a video display may be addressed in an XY coordinate system wherein an X address selects one of 768 pixels in a scan line of a video frame while a Y address selects one of 512 scan lines or rows within a video frame. This represents only a portion of a complete frame which can be considered to have 910 pixels per scan line and 525 scan lines per frame. Each of the $16K \times 1$ memory chips is effectively arranged in parallel to provide frame store 50 with a very high input/output band width which enables it to support simultaneously real time video input from input scanner 44, real time video output through video output processor 42 to monitor 38, access by a bus master on computer bus 12 through picture address transform interface 48, refresh access to permit refreshing of the memory chips, and access by at least one more video processing system device in the event of furture expansion.

The frame store data bus 56 contains 104 data lines, which are grouped as 32 for each of the three component stores and 8 for the overlay store. A multiplexer 54 permits selection of one of these groups for transfer over a 32 bit data bus to provide communication through the picture address transform interface 48 to a bus master on computer bus 12.

In the word/byte mode the three components of the frame store other than the overlay component store read one word (16 bits) or one byte (8 bits) of information for each XY pixel location. In the multiple byte mode these components store and read a super word containing 24 bytes which correspond to 24 adjacent pixels in a scan line of a video frame. The 768 pixels for any given scan line may thus be contained within one of 32 super words for the scane lines. Each of the super words is communicated on the frame store data bus 56 as six serial slices or barrels of 4 bytes each. Because the overlay memory stores only one bit for each pixel location rather than an eight bit byte as for the three component memories, an overlay super word contains only 3 bytes. Separate input and output latches permit the frame store 50 to write in information from input scanner 44 or another source while data is being transferred over frame store data bus 56 from the output latches to video output processor 42 for display on the color monitor 38.

Figure 2:
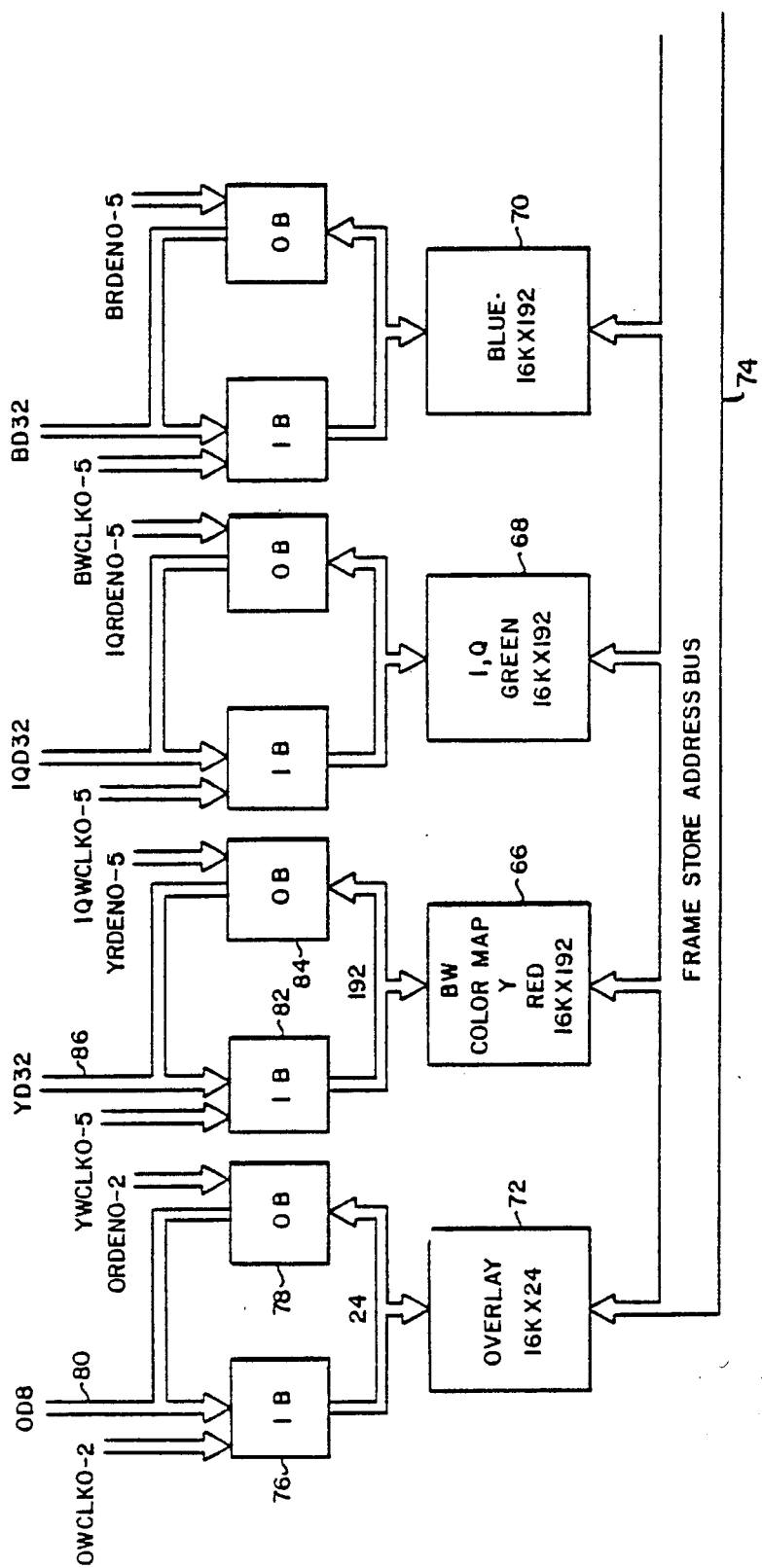
FIG. 2 is a block diagram representation of a frame store for the computer graphic system shown in FIG. 1.

Referring now to FIG. 2, frame store 50 includes four memory components including Y/Red component 66, I,Q/Green component 68, blue component 70 and overlay component 72. In the case of a color map system, Y component 66 would be implemented to store the video frame information while IQ component 68 and blue component 70 would not be implemented. However, the system is readily expandable by simply inserting memory cards into available slots. For example, a black and white momochrome system or color mapped system can be expanded to a Y, I,Q system by simply inserting three 16K×64 memory cards to implement I,Q component 68. The two component frame store can then be further expanded to a full red, green, blue (r, g, b) system by adding still three more memory cards to form blue component 70. Overlay component 72 may be utilized as an option with any of the available monochrome, color mapped, Y, I,Q or rgb configurations. It will further be appreciated that other configurations such as YUV could be implemented in accordance with the principles of this invention with minor modifications.

Although the frame buffer 50 is addressed externally of memory controller 52 as four selectable components storing video information in an X/Y matrix, internally each of the frame store components is comprised of memory boards having a configuration of 16K words by 64 bits per word. Since each of the frame store components 66, 68, and 70 is implemented with three memory boards, each frame store read or write access results in a transfer of 192 bits for each of these memory components. Furthermore, the resolution or storage capacity of each of the components 66, 68, 70, 72, may be increased by adding additional memory capacity for each component by adding additional memory boards in half board increments. Although the boards have a 16K×64 configuration for data transfer purposes, for address selection and control purposes the memory chips of the boards are grouped into 8 bit bytes with each board having 8 bytes of parallel information. Each byte stores video information for a single pixel at an X, Y matrix location and is further divided into an upper half and a lower half so that memory increments may be provided in half board capacity or groups of 16K×4 bytes. The three boards for each of the memory components 66, 68 and 70 thus produce 192 bits or 24 bytes of data in parallel corresponding to 24 pixels of video information. These 24 bytes of data are referred to as a super word and are organized to contain video information for 24 adjacent pixels along the X matrix coordinate with a super word boundry being coterminus with the first pixel of each scan line of the matrix. The XY matrix of pixels is deemed to start at the upper left hand corner with pixel 0,0 with the X coordinate increasing toward the right with each pixel position and the Y coordinate increasing downwardly with each row or scan line. This configuration thus results in 32 super words to define the 768 pixels in each row times 512 scan lines for a total of 16K super words. It will be recalled that only scan lines 0 through 484 are acutally visible with the remaining scan lines being available for purposes other than storing video pixel information such as storage of color selection information. The primary frame store components 66, 68 and 70 are addressed by 14 bits selecting one of 16K words in each memory chip with the 14 bits being conventionally multiplexed as 7 row bits and 7 column bits. Common row select signals are sent to all of the memory chips with individual column address select signals (24 per component) providing individual byte level selection. That is, any single byte or pixel of information may be selected from any one of the memory components for the reading or writing of information.

The overlay frame store 72 has the same X,Y matrix coordinate addressability as the other frame store components but stores only 1 bit of information instead of 8 bits for each pixel location. Consequently, overlay store 72 contains only half of a memory card and is organized as 16K words by 24 bits or 3 bytes. At each memory access overlay store 72 reads or writes 24 bites of information corresponding to the same 24 pixels which comprise a super word for the primary frame store components. Overlay store 72 is byte addressable in a manner similar to the primary components except that each byte corresponds to 8 individual pixels in a row matrix rather than a single pixel as in the case of the primary components.

Each of the frame store components has an input buffer and an output buffer capable of storing a super word of information. Overlay store 72 has a 24 bit input buffer 76 and a 24 bit output buffer 78. Input buffer 76 is divided into three controllable bytes which are connected in parallel to an 8 line data bus OD8 80 which forms a portion of the data bus 56 shown in FIG. 1. The 3 bytes of input buffer 76 are individually controllable by 3 overlay write clock lines OWCLK0-2. Similarly the 3 bytes of output buffer 78 are individually enabled to place data on bus OD8 by 3 overlay read enable lines ORDEN0-2.

Data is transferred over data bus 56 which includes bus OD8 80 in six high speed data transfer cycles with a slice or barrel of information being transferred during each of the six cycles. In the case of the overlay store 72, a first byte of data is transferred redundantly during the first and second cycles, a second byte is transferred redundantly during the third and fourth cycles and a third byte is transferred redundantly during the fifth and sixth cycles. This redundancy is utilized to maintain pixel coordinate synchronization with the larger frame store components which require a much greater data transfer bandwith.

Y component frame store 66 has a 192 bit input buffer 82 and a 192 bit output buffer 84. Each of the buffers is connected to a 32 bit Y component data bus 86 which is designated YD 32 and forms a part of data bus 56 as shown in FIG. 1. The buffers for Y component 66 are configured as six groups of 4 bytes each and are arranged to receive from or place data on YD 32 bus 86 in groups of 4 bytes in response to 6 Y write clock control signals designated YWCLK0-5 and 6 Y read enable signals designated YRDEN0-5. The 192 bits of a super word are thus transferred over the data bus YD 32 in six successive high frequency slices or barrels of 32 bits or 4 bytes each. The buffering and data transfer organization for I,Q store 68 and blue store 70 is substantially identical to Y component 66 and will not be further described.

The use of input and output buffers for each frame store component provides the frame store 50 with an extremely wide data bit bandwidth which permits 600 bits to be read or written in parallel while the multiplexing of the buffers onto data bus 56 in six separate slices or barrels enables the data bus 56 to have an economically feasible size. This extremely high bandwidth for the frame store 50 enables continuous, real time access to the frame store by both the video output processor 42 driving a color monitor 38 and input scanner 44 receiving video camera information. This means that the color monitor 38 may display essentially real time information as it is received by input scanner 44. It will be appreciated that there will be a small phase delay which is required for the video signal to be pipe lined through the video processing system 24. The bandwidth of frame store 50 is sufficient that while it is supporting real time video accesses by input scanner 44 and video output processor 42 it can simultaneously support lower frequency accesses by additional components such as picture address transform interface 48, and chip refresh circuitry.

Figure 3:
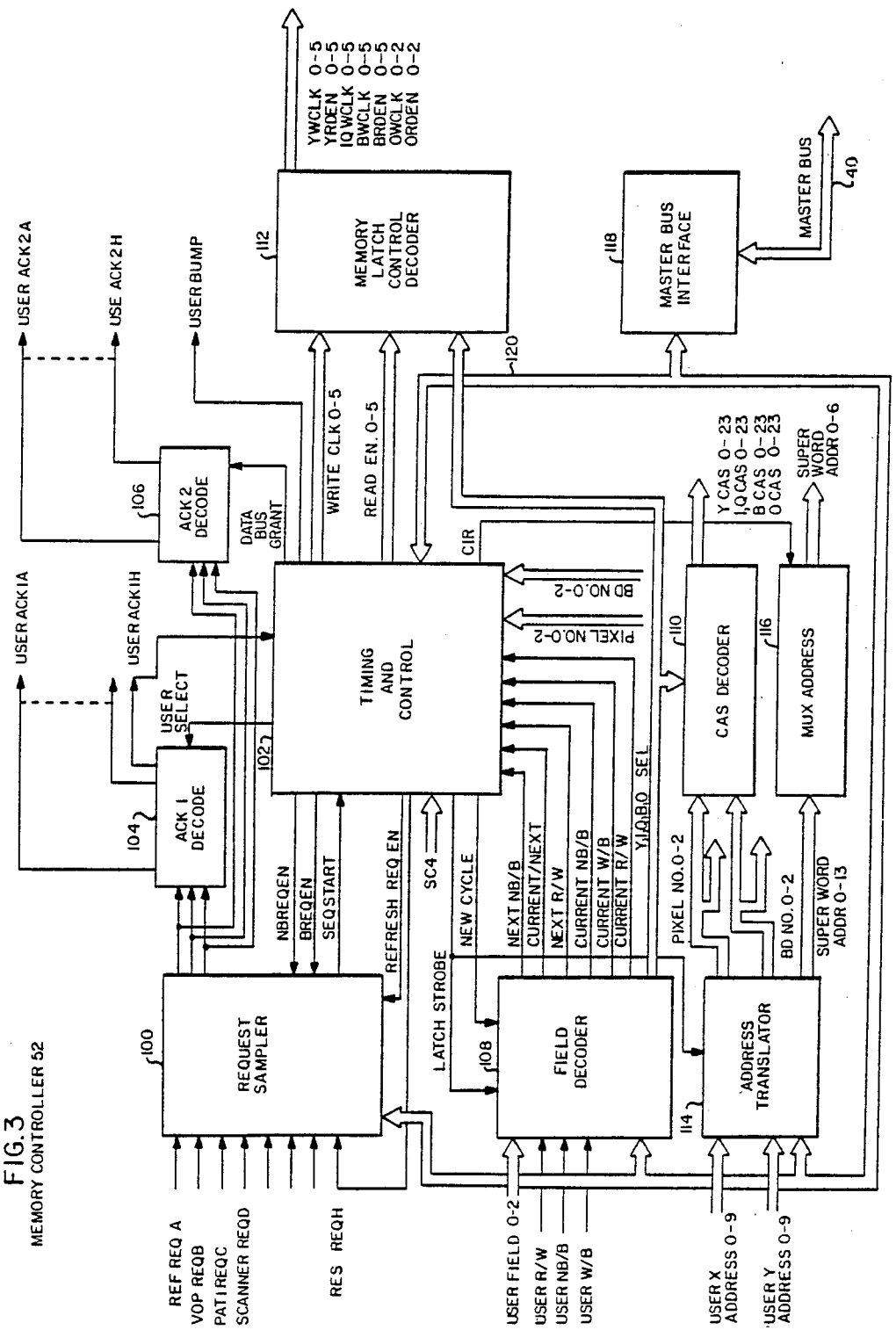
FIG. 3 is a block diagram representation of a memory controller for the computer graphic system shown in FIG. 1.

Referring now to FIG. 3, there is shown in greater detail the memory controller 52 which receives X/Y addresses and frame store access requests from various components in the video processing system 24 and in return generates address and timing commands to access the actual hardware configuration of the frame store components in frame store 50. A request sampler 100 receives frame store access requests from frame store users at 8 inputs designated REQA through REQH and grants the request on a priority basis with input REQA having the highest priority. A memory refresh request is granted the highest priority at input A and is granted only when a refresh request enable signal from timing and control logic 102 is active. The memory refresh can be disabled for a diagnostic or maintenance mode of operation. During normal operation the input scanner 44 and video output processor 42 access frame store 50 on a sufficiently rapid and sequential basis to meet the refresh requirements for the memory storage chips of frame store 50. Three encoded signals identifying a selected user are presented to an acknowledge one decode circuit 104 and an acknowledge two decode circuit 106. The acknowledge one decode 104 generates a user acknowledge one signal to the selected user in response to a user select signal from timing and control circuit 102. The user responds to the user acknowledge one signal by placing X/Y address and other control information on the user bus 108. Thereafter, acknowledge two decode responds to a data bus grant from timing and control circuit 102 to generate a user acknowledge two signal for the selected one of eight users to command the user to place data on or receive data from the data bus 56. In the event of a byte or word type of data transfer, timing and control circuit 102 generates a single pulse on a signal designated user bump which serves as read/enable pulse or write strobe by the user which is enabled by the user acknowledge two signal. In the event of a barrel type of transfer over data bus 56, six sequential pulses are generated on the user bump signal by timing and control circuit 102, to clock the six sequential slices of a super word. Request sampler 100 provides to timing and control circuit 102 a sequence start command to initiate a frame store access sequence and receives back non-barrel request enable and barrel enable signals to enable request sampler 100 to latch a highest priority user request at a given instant of time.

A field decoder 109 receives a 3 bit user field signal on user bus 108 which may be decoded to address a particular one of the frame store components 66, 68, 70, or 72 within frame store 50. For example, zero may select overlay component 72, one may select Y component 66, two may select I,Q component 68, three may select B component 70 and seven may select all four components simultaneously. Field decoder 109 outputs to a column address select decoder 110 and a memory latch control decoder 112 five individual signals reflecting the selection of the individual frame store components, Y, I,Q, B and O in response to the three user field inputs. Field decoder 109 also receives user control signals indicating whether a requested access is a read or a write access, indicating whether a requested access is to be a full super word barrel type of access or a non-barrel access and if a non-barrel access is requested whether the access is to be a word access or a byte access.

Shortly after timing and control circuit 102 generates a user select signal causing a requesting user to place address and control information on the user bus, it generates an address latch strobe signal which causes field decoder 109 as well as an address translator 114 to receive and latch the user information.

Each time a new memory access cycle begins timing and control circuit 102 provides another cycle pulse to field decoder 108. In order to maximize the full bandwidth of frame store 50 and its connecting data bus 56 an interleave type of data transfer is performed. The field decoder 109 must therefore keep track of a current memory access cycle as well as a next memory access cycle and the new cycle command causes field decoder 109 to release information pertaining to a current cycle, redesignate next cycle information as current cycle information and accept new next cycle information. For example, during a current read cycle, while information is being addressed in the individual memory chips and transferred to output buffers of the frame store components, data can be barreled in six successive slices over the data bus to input buffers of the frame store components for a next write cycle. Upon completion of the current read cycle the read data can be barreled over the data bus 56 while the previously buffered write data is written into the frame component stores. To enable this overlapped operation field decoder 109 provides timing and control circuitry 102 with signals indicating whether the next frame store access cycle is a non-barreled or a barreled type of access, whether a current or a next cycle is similar, whether the next access is a read or a write access, whether the current access is a non-barreled or barreled access, whether the current access is a word or byte access if it is a non-barreled type of access and whether the current access is a write or a read type of access. Timing and control circuit 102 responds to this information by generating timing and control signals to make proper address information available to the component memory chips and input and output buffers and to control the transfer of information over data bus 56.

An address translator 114 includes a programmable ROM which receives the X,Y pixel matrix selection addresses as a 10 bit X or row address and a 10 bit Y or scan line address and in response provides a translation to a 14 bit super word address which serves as a word address for the actual 16K memory chips and a 3 bit memory board number and 3 bit pixel number which permit the identification of a particular word or byte within a super word during a non-barreling type of memory access.

An address multiplexer 116 receives the 14 bit super word address as well as a column/row select signal from timing and control circuit 102 to convert the 14 bit super word address to two time division multiplexed 7 bit addresses identifying first a selected row and then a selected column within a memory chip.

Column address strobe decoder 110 responds to the 4 Y/Red, I/Q/Green, Blue and O select signals as well as the board number and pixel number select signals to generate column address strobe signals to individually control the accessing of each separately controllable data byte within frame store 50. That is, 24 column address strobe signals are generated for each of the primary frame store components 66, 68, and 70 with 3 column address strobe signals being generated for overlay component 72. For a barrel type of read access or a barrel type of write access all byte locations within a selected frame store component, which may be any one component or all components, are activated. In the event of a non-barreling type of read access, full super words of data are loaded into the output buffers with a single slice being selected for transfer over data bus 56 and the other 5 slices being ignored. However, in the event of a non-barrel write type of operation only one word or one byte of a 24 byte input buffer stores valid information and a selected 2 or 1 column address strobe signal must be activated to enable the writing of a word or byte of information into only the corresponding 2 or 1 bytes of data storage locations.

Memory latch control decoder 112 generates 6 control signals for each of the primary frame store component input and output buffers and 3 control signals each for the overlay component input buffers and output buffers to control the transfer of information between the input and output buffers 76, 78, 82, and 84, with data bus 56. In the event of a barrel type of transfer, each of the six signals for a selected read or write direction of transfer is enabled in sequence for each of the frame store components transferring data. The Y/Red, I/Q/-Green, Blue and O select signals from field decoder 109 enable the generation of these buffer control signals for one or all of the frame store components in accordance with the user field 0–2 inputs as previously indicated. In the event of a barrel type of data transfer the six sequential write clock signals for a data transfer are generated in response to 6 write clock signals WRITECLK0–5 from timing and control circuit 102 while the 6 read enable signals are generated sequentially in response to 6 READ ENABLE SIGNALS 0–5 from timing and control circuit 102. In the event of a non-barrel type of data transfer, timing and control circuit 102 receives the board number and pixel number encoded outputs from address translator 114 to select only a write clock or read enable corresponding to the single one of six super word slices which contains the addressed word or byte and activates only the corresponding write clock or read enable signal. Consequently, only a single slice of data for each selected memory component is transferred over the data bus for a non-barrel cycle. It is up to the user to receive the full slice and select the desired word or byte from the 4 byte slice.

A master bus interface circuit 118 provides a coupling and decoding for master bus 40 into a maintenance bus 120. Maintenance bus 120 provides a bus master on computer bus 12 direct addressable access through master bus 40 to selected word spaces within memory controller 52 for maintenance and diagnostic purposes. While the exact connections of maintenance bus 120 have been omitted for simplicity, it will be appreciated that bus 120 may carry data to be loaded into memory controller registers in response to addressed write commands and similarly addressable gates may selectively place data on the maintenance bus 120 in response to address read commands. For example, it may be desirable for the CPU 14 to be able to addressably write into the input latches for request sampler 100, field decoder 109 and address translator 114 to simulate user command signals. Similarly, selected register outputs for control signals may be gated through the maintenance bus to CPU 14 to sample and investigate the response of the memory controller 52. It will be noted that maintenance bus 120 also extends to timing and control circuits 102. The principles by which data is addressably written into and read from subsystem data spaces are described in further detail in application Ser. No. 139,332 (now U.S. Pat. No. 4,280,138) filed simultaneously with the present application for Frame Period Timing Generator For Raster Scan Video System by Rodney D. Stock and commonly assigned with this application.

Figure 4:
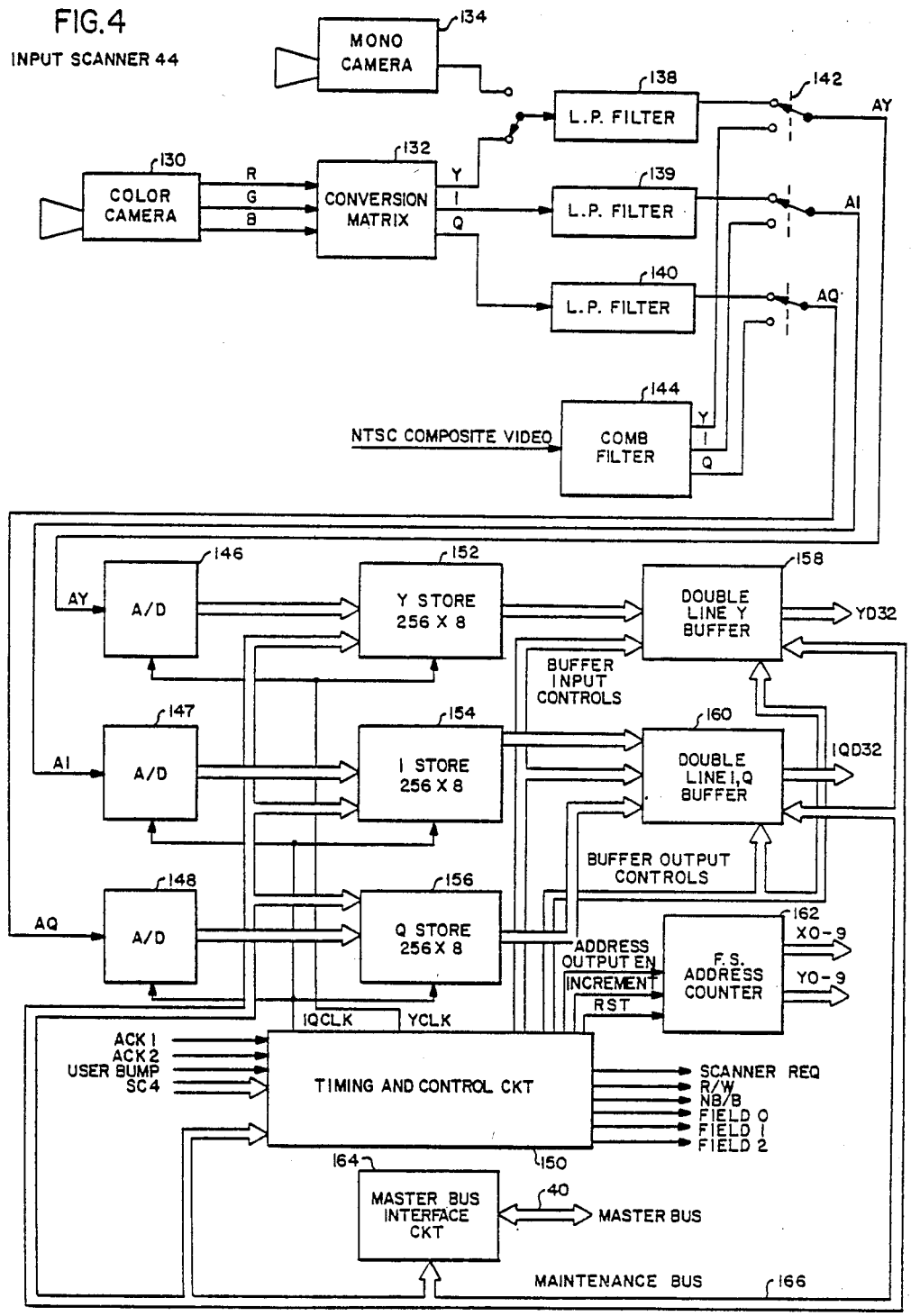
FIG. 4 is a block diagram representation of an input scanner for the computer graphic system shown in FIG. 1.

Referring now to FIG. 4, the input scanner 44 includes a color camera 130 coupled to provide red, green and blue video color signals to a conversion matrix 132 which converts the RGB color signals to a YIQ format. Alternatively, in a monochrome system a monochrome camera 134 supplies the Y intensity signal through a switch 136 selecting the Y signal from either the monochrome camera 134 or the conversion matrix 132. In a monochrome system the components of input scanner 44 relating to the I and Q signals would of course be unnecessary.

The Y, I, and Q video signals are communicated through low pass filters 138, 139 and 140 respectively to a double pole triple throw switch 142 having one set of contacts coupled to receive the YIQ outputs of filters 138, 139 and 140 and a second set of poles coupled to receive YIQ outputs generated by a comb filter 144 in response to an NTSC composite video signal. The analog outputs from switch 142 designated AY, AI, and AQ are sampled and converted to 8 bit digital representations by analog-to-digital converters 146, 147 and 148. Analog-to-digital converter 146 samples signal AY at a pixel rate having a period of approximately 70 nanoseconds, in response to signal YCLK generated by a timing and control circuit 150. Similarly, A to D converters 147 and 148 sample signals AI and AQ respectively at a rate of one-half the pixel rate in response to a signal IQCLK from timing and control circuit 150. This half rate sampling enables the I and Q signals when combined together in IQ component frame store 68 with the I samples in the even numbered pixel locations and Q samples in the odd numbered pixel locations to have a total data rate equal to the Y signal data rate. This enables the combined IQ signals to be handled synchronously and in parallel with the Y signal.

A Y store 152 operates under control of clock signal YCLK to receive the 8 bit output of A to D converter 146 as a read address input and in response it outputs an 8 bit word corresponding thereto. Y store 152 provides an extremely simple and economical yet effective means of varying the Y signal in accordance with a predetermined function. As an example, Y store 152 might store at each of its 256 addressable locations data equal to the address for the location. This would result in the output of Y store 152 being identical to the input. Alternatively, the Y store 152 could contain data providing a correction for nonlinearities in the Y signal or providing any other desired functional relationship between the input and the output. An I store 154 and a Q store 156 permit similar functional transformations of the I and Q signals respectively. A double line Y buffer 158 contains two 768×8 line buffers for storing the Y component of the video signal as it is received from Y store 152. Timing and control circuit 150 provides buffer input controls for storing a line of video information in a first buffer portion of double line Y buffer 158. As soon as the first portion stores a line of video Y component information, a switch is made and buffer input controls begin causing the second line buffer to receive and store the second line of video information. In a two field format it will be appreciated that the second line will correspond to the second line of the first field or the third line of a complete frame. As the second line of information is being loaded into the second portion of double line Y buffer 158, timing and control circuitry 150 generates buffer output control signals which command the first portion of double line Y buffer 158 to output the previously stored first line of information to the Y component 66 of frame store 50 over Y data bus YD32 portion of data bus 56. By the time the second portion of double line Y buffer 158 has received the second line of information, the first portion will have transferred its entire contents to the Y frame store component 66 and it can then begin receiving the third line of video information while the second line of video information is transferred from the second portion of double line Y buffer 158 to appropriate locations in Y component 66 of frame store 50. It will be appreciated that double line Y buffer 158 thus permits complete lines of data to be transferred to Y component 66 while providing buffering to accommodate delays in obtaining access to frame store 50 as well as the alternate pauses and bursts which result from the wide bandwidth of superword transfers over data bus YD32 in six sequential slices or barrels of 4 bytes each. That is, after a 24 byte superword is transferred over the data bus in rapid succession, a pause may be encountered as the input scanner 44 awaits access to the frame store 50 for another data transfer. Under normal circumstances it is to be expected that the output portion of double line Y buffer 158 will be emptied into frame store component 66 before the other portion is filled with a line of incoming video data.

The operation of double line IQ buffer 160 is substantially identical to the operation of double line Y buffer 158 except that double line IQ buffer receives alternately outputs from I store 154 and Q store 156 under control of a signal QFLAG. Since each of these outputs is received at half the data rate of the output of Y store 152, the total data rate for double line IQ buffer 160 is identical to that of double line Y buffer 158. A frame store address counter 162 identifies X, Y matrix superword boundaries for superwords being output from the double line buffers 158, 160 to frame store 50 and is incremented for each superword output by timing and control circuit 150. Timing and control circuit 150 also provides an address output enable signal in response to the ACK1 (ACKNOWLEDGE 1) signal from memory controller 52 and generates a reset signal which permits synchronization of address counter 162 with the incoming video signal. Timing and control circuit 150 also receives and generates the user bus control signals which have been described in conjunction with memory controller 52. The field 0-2 outputs specify a number 6 which identifies the selection of Y component 66 and I, Q component 68 of frame store 50 for the simultaneously transfer of data. It will be appreciated that with slight modifications, such as the addition of a third double line buffer to provide buffering for three color components, and appropriate modifications to conversion matrix 132 and LP filters 138-140, the input scanner 44 could be converted into a full RGB 3 color input scanner for use in a configuration wherein frame store 50 is implemented with three primary frame store components 66, 68 and 70 which would store the component signals for the red, green and blue signals respectively.

A Master Bus interface circuit 164 and its associated maintenance bus 166 provide a connection to Master Bus 40 to permit a computer bus 12 master to have addressable read and write access to selected data storage locations and data status information of the input scanner 44. In a manner similar to the implementation of maintenance bus for memory controller 52, maintenance bus 166 permits the writing as well as the reading of selected word locations for the Y store 152, I store 154 and Q store 156 as well as the writing of data into and reading of data from double line buffers 158 and 160. Maintenance and diagnostic access is also provided to selected information groups within timing and control circuit 150. Input and output buffers for each frame store component provide the frame store 50 with an extremely wide data bit bandwidth which permits 5790 bits to be read or written in parallel while the multiplexing of the buffers onto data bus 56 in six separate slices or barrels enables the data bus 56 to have an economically feasible size. This extremely high bandwidth for the frame store 50 enables continuous, real time access to the frame store by both the video output processor 42 driving a color monitor 38 and input scanner 44 receiving video camera information. This means that the color monitor 38 may display essentially real time information as it is received by input scanner 44. It will be appreciated that there will be a small phase delay which is required for the video signal to be pipelined through the video processing system output processor 42. The bandwidth of frame store 50 is sufficient that while it is supporting real time video accesses by input scanner 44 and video output processor 42 it can simultaneously support lower frequency accesses by additional components such as picture address transform interface 48 and memory refresh circuitry.

Figure 5:
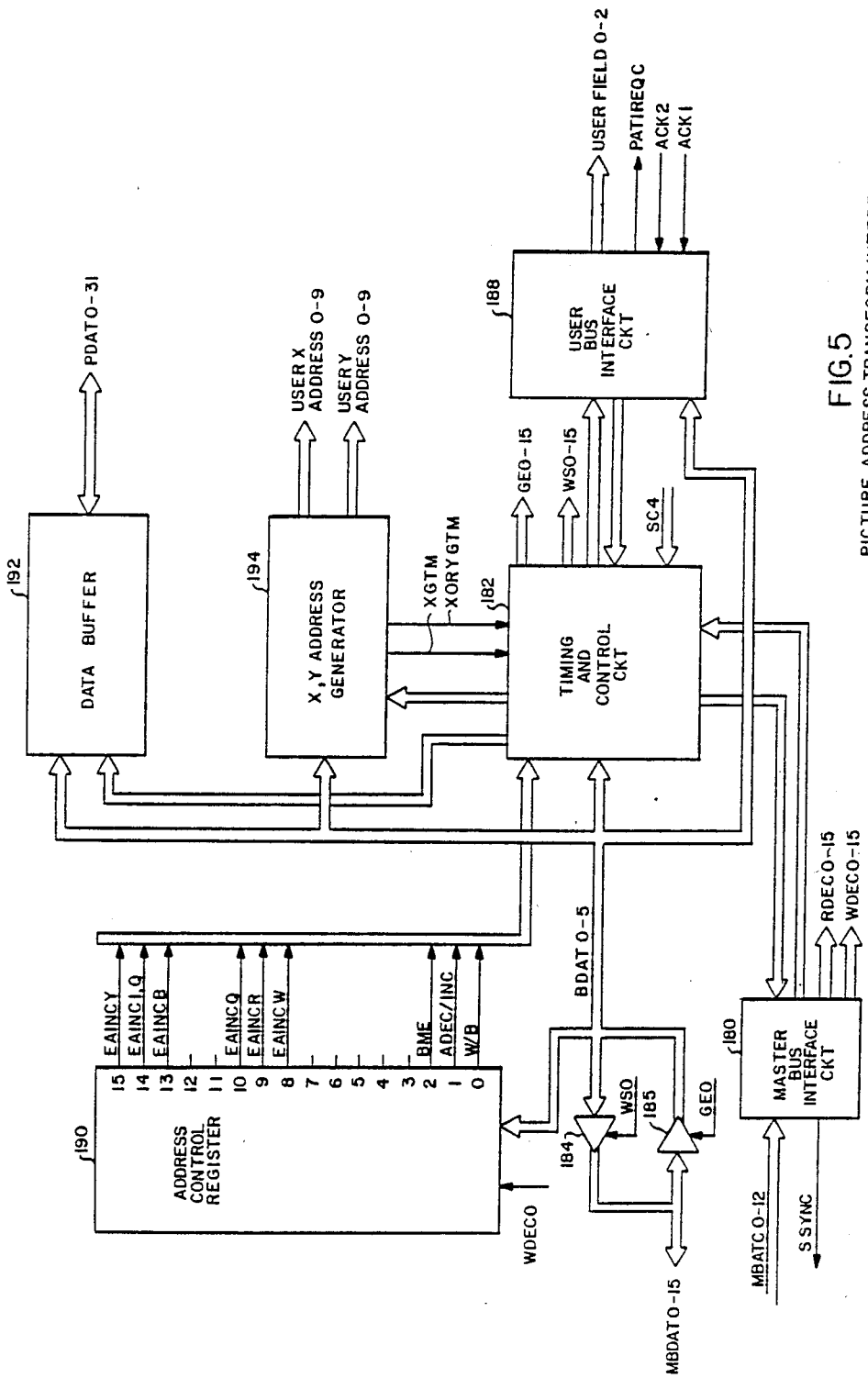
FIG. 5 is a block diagram representation of a picture address transform interface for the computer graphic system shown in FIG. 1.

Referring now to FIG. 5, the picture address transform interface circuit (PATI) 48 includes a Master Bus interface circuit 180 receiving the Master Bus address and control signals 0-12 and providing a system sync signal, SSYNC, back to the Master Bus to facilitate communication between Master Bus 40 and PATI 48. PATI 48 further includes a timing and control circuit 182 which receives Master Bus control signal information from Master Bus interface circuit 180 and generates the required timing and control signals for the PATI 48 in response thereto. These control signals include signals transferred to Master Bus interface circuit 180 to enable the generation of decoded read decode signals, RDEC0-15, and write decode signals, WDEC0-15, for selection of specific register and gate locations in response to Master Bus addresses. Timing and control circuit 182 also generates selected decoded signals for gating and loading selected data and register locations designated respectively GATE enable, GE0-15, and write strobe, WS0-15. A pair of tristate buffers 184, 185 are enabled in response to decoded timing signals WS0 and GE0 to provide bidirectional communications between the 16 bit master data bus and a 16 bit buffered data bus internal to the PATI 48. Buffered data bus 0-15 provides communication to all of the major operating components of PATI 48 including timing and control circuits 182, a user bus interface circuit 188, an address control register 190, a data buffer 192 and an X Y address generator 194.

Address control register 190 is loaded with data from the master data bus in response to write decode signal WDEC0 from Master Bus interface circuit 180. Address control register 190 stores status information provided by CPU 14 to control the mode of operation of PATI 48.

Because of the large number of pixels in a single frame of a television video image (768 pixels per row ×485 rows or scan lines), it is not feasible to utilize the normal CPU address space to distinguish individual pixel locations within a frame of video information. The identification of a pixel location by the CPU 14 is accomplished by first transferring over the computer bus 12 and Master Bus 40 a 10 bit X address identifying a particular pixel location within a row and then transferring a 10 bit Y address identifying a particular row within a frame. A third data transfer is utilized to access the video information corresponding to the pixel location. Since the three primary frame store components 66, 68 and 70 store one byte of information for each pixel location and overlay component 72 stores one bit of information for each pixel location but transfers data only in byte level data groups, up to 4 bytes of data must be transferred to communicate with a single pixel location in all four frame store components.

To facilitate sequences of frame store accesses and avoid the need to transfer a word of X address information and a word of Y address information for each of a sequence of pixel locations, PATI 48 implements block or non-, block modes of operation under control of address control register 190 to provide automatic incrementing of address locations under circumstances which may be defined by the CPU loading the selected mode control information into address control register 190. Bit locations 15, 14, and 13 respectively of address control register 190 store data bits for enabling automatic incrementing of pixel addresses in response to accesses to the Y/Red frame store component 66, IQ/-Green frame store component 68 and blue frame store component 70. Bit position 10 similarly stores a bit for enabling automatic incrementing in response to the accessing of overlay frame store component 72. Bit positions 9 and 8 store bits designated EAINCR and EAINCW for enabling automatic incrementing on read or write accesses respectively. Bit position 2 commands block mode operations with a logic one block mode enable bit, BME, or single read or write accesses with no automatic incrementing in Y when zero. Bit position 1 indicates whether the pixel addresses are to be decremented or incremented during a block mode operation with a signal designated ADEC/INC. Bit position zero is effective only in a non-block mode operating condition and indicates whether a word or a byte of data has been requested.

The block mode of operation provides for multiple word transfers in the same direction. The X, Y address must start on a superword boundary (the beginning of each line, i.e., X=0, is guaranteed to be a superword boundary) and the number of transfers must be an integral number of superwords.

The user bus interface circuit 188 responds to timing and control signals from timing and control circuit 182 as well as frame store component selection signals communicated as part of a computer bus master address designation through Master Bus interface circuit 180 and timing and control circuit 182 to the user bus interface circuit 188. In response, user bus interface circuit 188 generates the combination of user field signals 0-2 to select an addressed frame store component. User bus interface circuit 188 also generates the PATI request C signal which informs memory controller 52 that PATI 48 is seeking an access to frame store 50. User bus interface circuit 188 also receives the ACK1 and ACK2 return timing signals from memory controller 52.

Figure 6:
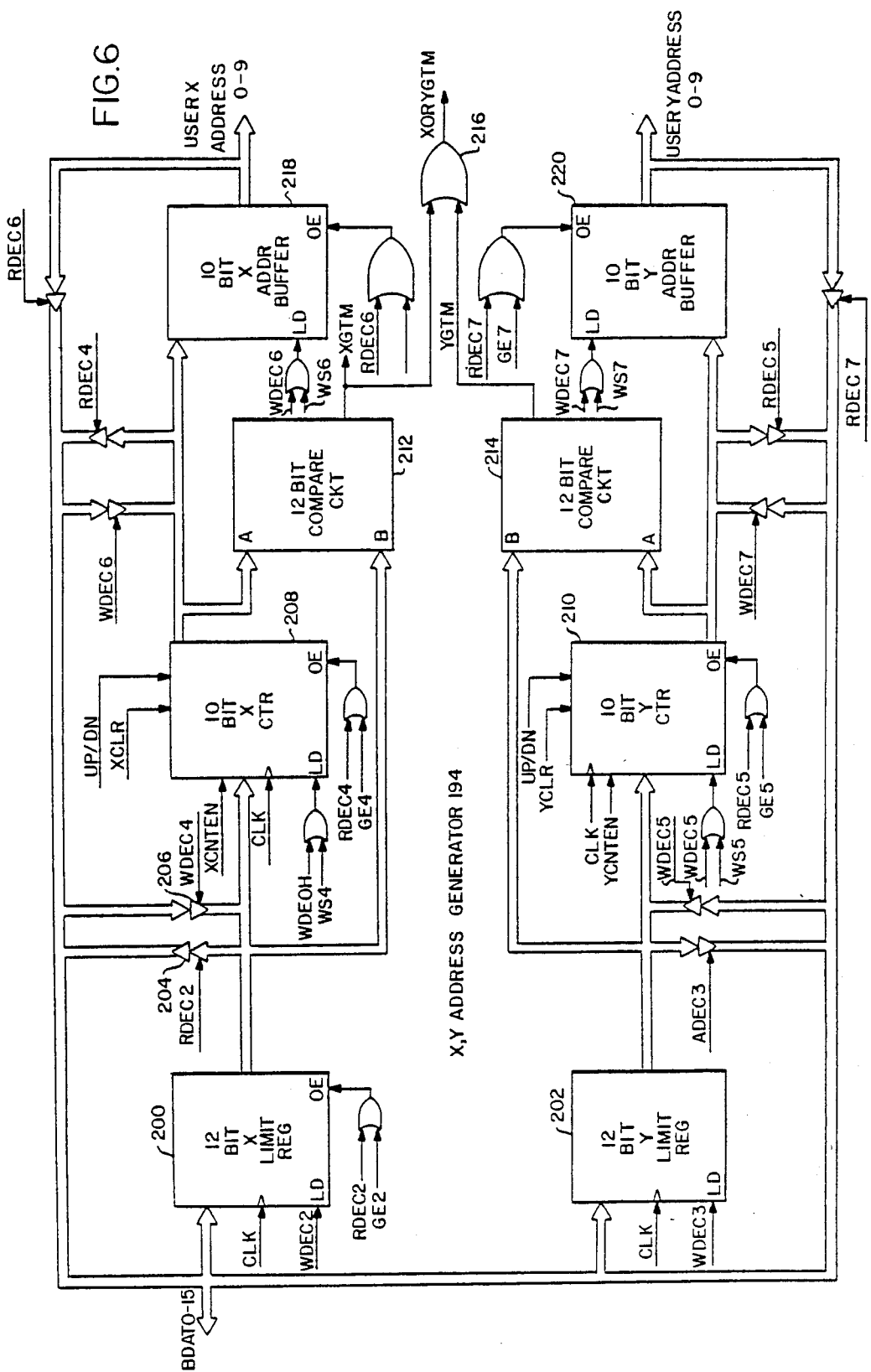
FIG. 6 is a block diagram representation of an X, Y address generator for the picture address transform interface shown in FIG. 5.

Referring now to FIG. 6, the X, Y address generator 194 includes a pair of 12 bit X and Y limit registers or fences 200, 202. These registers may be loaded with CPU generated data transferred over the buffered data bus. Even though the X and Y addresses have a maximum size of 10 bits, the use of 12 bit limit registers avoids the possibility of treating an address increment or an address supplied by the CPU as a wraparound with information which extends off the video display to the right being displayed at the left improperly. The limit registers provide an automatic hardware check for video frame boundaries and thus relieve the CPU 14 of a considerable amount of program execution time which would normally be required to provide checks to be certain that each selected pixel address location is within the address range of a video frame. The limit registers also provide programmable indications of maximum address limits to permit automatic incrementing during block mode transfers. For example, on detecting that the X address counter has reached a maximum limit, the counter is reset and the Y address counter is incremented by one to begin an access at a new line of a frame.

Each of the components of X, Y address generator 194 is implemented with tristate gating to permit easy selection of data transfers from one location to another with the Master Bus interface and timing and control decoded output signals. For example, by enabling the output of 12 bit X limit register 200 with a signal RDEC2 and simultaneously enabling a tristate gate 204 with the same signal, the CPU can cause the contents of the 12 bit X limit register to be placed on the buffered data bus for transfer to the computer bus 12 for maintenance and diagnostic purposes. Alternatively, the output of 12 bit X limit register 200 can be disabled with its output bus being utilized to transfer data from the buffered data bus through tristate gate 206 to a 10 bit X address counter 208. A 10 bit Y address counter 210 may be loaded in a similar manner.

A 12 bit compare circuit 212 receives at its B input the output of 12 bit X limit register 200 and at its A input the output of 10 bit X counter 208 and generates an output signal X greater than maximum, XGTM, any time the contents of the X address counter 208 exceed the contents of X limit register 200. Depending upon the circumstances and mode of operation, signal XGTM might indicate that the end of a scan line has been reached and that the X counter should be reset to zero with the Y counter being incremented to begin a new scan line or might indicate that an improper address has been loaded into X address counter 208 from the data processing system. In this event, the PATI 48 engages in data transfers with the computer bus 12 but disables data transfers with frame store 50 until the improper address condition has been corrected. Similarly, a 12 bit compare circuit 214 compares the 10 bit Y address stored in counter 210 with the 12 bit limit address stored in counter 202 to generate a Y greater than maximum signal YGTM, whenever the Y counter 210 indicates an address greater than the limit address which has been previously loaded into limit register 202. An OR gate 216 receives the signals XGTM and YGTM to generate a signal X or Y greater than maximum, X OR YGTM to indicate a possible error condition to the timing and control circuit 182. A 10 bit X address buffer circuit 218 receives an X address from X address counter 208 and holds the address during frame store read or write accesses. Similarly, a 10 bit Y address buffer 220 receives the 10 bit Y address from 10 bit Y counter 210 and holds this address during read or write frame accesses. The use of this address buffering enables the X and Y address counters 208, 210 to be modified while relatively long duration 6 slice superword data transfers are in progress.

While all of the buses, gates, and load and output selection enable logic for X,Y address generator 194 have not been described in detail, it will be appreciated that each of the storage locations can be write strobed in conjunction with the enabling of selected register outputs and gates to provide the required communication of data from one location to another.

Figure 7:
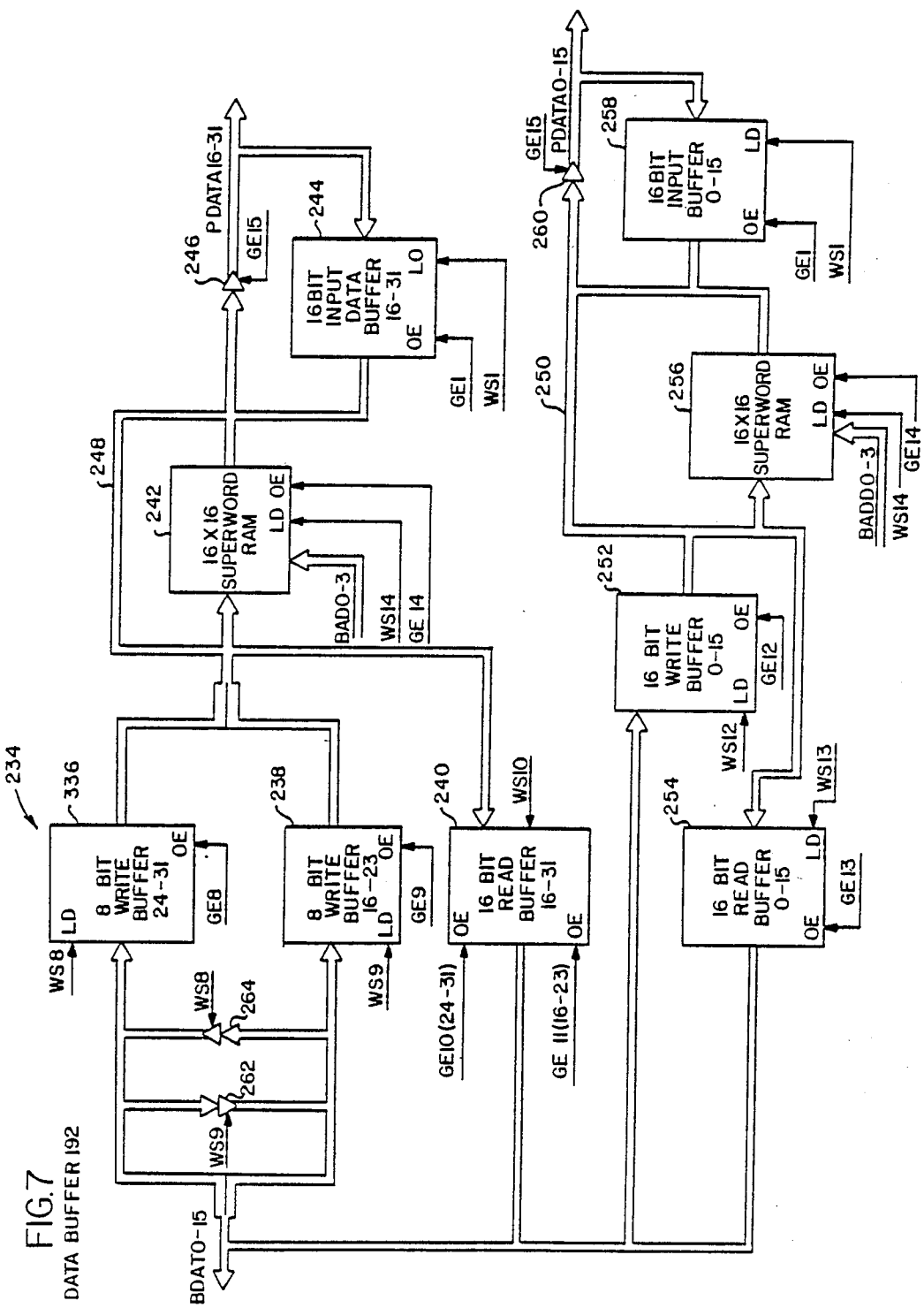
FIG. 7 is a block diagram and schematic representation of a data buffer shown in the picture address transform interface shown in FIG. 5.

The data buffer 192 for PATI 48 is illustrated in greater detail in FIG. 7, to which reference is now made. Data buffer 192 is comprised of two sections corresponding to an upper word or bit positions 16–31 of the P data bus to multiplexer 54 and a lower word corresponding to bit positions 0–15 for the P data bus.

The upper half of data buffer 192 includes a 16 bit write buffer 234 having two 8 bit sections 236 and 238, a 16 bit read buffer 240, a 16 word×16 bit superword RAM 242 of which only 6 words are actually used, a 16 bit input data buffer 244 and a 16 bit gate 246 connecting an upper data bus 248 with the P data bus lines 16–31. As with the X,Y address generator 194, each register and gate of the data buffer 192 is implemented with tristate outputs.

In a similar manner, the lower portion of data buffer 192 includes a lower data bus 250 interconnecting a 16 bit write buffer 252, a 16 bit read buffer 254, a superword addressable RAM 256, a 16 bit input buffer 258 and a gate 260 providing connection to the lower 16 bits of the P data bus.

In the event of a block mode data transfer, data is communicated as 32 bit superword slices between data buffer 192 and a selected component of frame store 50. The entire 32 bit capacity of data buffer 192 is thus utilized with the data being multiplexed onto the buffered data bus for transfer to the computer bus 12 in 16 bit words taken alternately from the lower and upper portion of data buffer 192. However, in the event of a byte or word mode access, data is transferred from frame store 50 to data buffer 192 as a single 32 bit superword slice containing four bytes and the specifically accessed one or two bytes might appear anywhere within the group of four bytes. However, to reduce the required programming for CPU 14 PATI 48 provides an automatic realignment in the case of byte or word access modes to place the data at a preferred location on the buffered data bus for transfer through the Master Bus 40 to computer bus 12. A single byte of data is always transferred at data bus bit locations 0–7 while a word or two bytes of data is transferred with the byte corresponding to the smallest pixel address at data bus locations 0–7 and the byte corresponding to the next pixel address at bit locations 8–15.

The possible relocation of these data bytes from a superword slice position to a data bus position is facilitated by the use of the two part write buffer 234 in conjunction with a pair of gates 262, 264. As an example, assume that PATI 48 is in a byte mode and a desired byte of information comes in from frame store 50 in the uppermost byte position corresponding to data bits 24–31. The byte will be received by input data buffer 244 and communicated over upper data bus 248 to read buffer 240. By enabling the uppermost output byte of read buffer 240 with signal GE 10, the information can be placed on the buffered data bus at the upper byte bit positions and then transferred through gate 262 to be duplicated at the lower byte bit positions in response to write strobe signals WS9 and WS9A and loaded into the lower 8 bit write buffer 238. From lower write buffer 238 the desired byte of data can then be transferred to the lower 8 bits of read buffer 240 for subsequent transfer to the computer bus 12 as the lower data byte through buffer data bus upon enabling the output of the lower portion of read data buffer 240 in response to gate enable signal GE 11. Alternatively, data can be transferred through the buffered data bus from upper read buffer 240 to lower write buffer 252. It is thus apparent that by utilizing transfers between upper and lower byte positions within the upper word portion of data buffer 192 as well as transfers between upper word and lower word transfers of portions of data buffer 192 either a byte or a double byte word of data received over the 32 bit P data bus may be relocated to any desired byte positions for transfer to the data processing system. The use of the data buffer 192 permits the storage of a superword to match the relatively low bandwidth of the computer bus 12 to the relatively high bandwidth of the 32 bit P data bus which connects to the frame store 50 through multiplexer 54. The buffering also serves to minimize waiting time and thereby maximize utilization of the computer bus 12.

As an example of a block type of data transfer assume that the CPU 14 commands a transfer from disk file system 18 to Y component 66 of frame store 50 of 128K bytes of data corresponding to successive pixel address locations commencing with pixel address 0,0. The 128K bytes of data is a typical limit imposed by the length of computer system controller length counters rather than by the PATI 48 which could handle longer strings of data transfers. The CPU 14 would initiate the data transfer by first writing the addresses 0,0 into X address counter 208 and Y address counter 210 and then placing PATI 48 in the proper mode by writing 1's into bit positions 15, 8, and 2 of address control register 190 writing 0's into the other positions. This enables automatic incrementing upon accessing the Y component 66 of frame buffer 50 with a write type of data access. The CPU 14 then establishes the proper address on computer bus 12 to write a 0 into the count control bit position of control register 38 and disable the incrementing of address counter 34. Disk file system 18 is then commanded to become bus master and perform a direct memory access by transferring the stated number of bytes of data from a designated disk file location to the PATI address which corresponds to the Y component 66 of frame store 50. This address is written into address counter 34 by CPU 14 and subsequently drives the address bits of computer bus 12 and hence master bus 40 during each of the 128K cycles of the ensuing direct memory access block mode data transfer operation.

The master bus interface circuit 180 responds to the selected address by causing timing and control circuit 182 and user bus interface circuit 188 to generate a user field code which identifies the Y component 66 of frame store 50 to memory controller 52 and multiplexer 54 to establish the proper addressing and data paths. PATI 48 then begins to receive word transfers from disk file system 18 over computer bus 12 and master bus 40 to the buffered data bus with alternate words being loaded into the lower and upper rams sections 256 and 242 respectively of data buffer 192 until 12 word transfers cause the rams to store a full superword. At this point, the user bus interface circuit 188 generates a PATI request C signal to the memory controller 52 and upon being granted access to the frame store data bus 56 the first superword is transferred to the frame store input buffer for Y component 66 in six successive slices. As each 4 byte slice is transferred to frame store 50 the X and Y address buffer register 218, 220 hold the initial 0,0 address while the X address counter 208 is incremented by 4 after each slice is transferred. Consequently, upon the completion of the six slice transfer X address counter 208 has been incremented to a count of 24 to indicate the beginning pixel address of the next superword, there being 24 bytes or pixels per superword. In the meantime, the read buffer registers 254 and 240 are available to receive the 13th and 14th data words from disk file system 18 while the first superword is being transferred to the Y frame component 66. Under normal circumstances, the PATI 48 will receive sufficiently quick response to a data transfer request and the six slices of data are transferred sufficiently rapidly that the superword ram 242, 256 can be emptied and receive data from the read buffers 240, 254 respectively before the relatively slow disk file system 18 and computer bus 12 are ready to transfer the 15th word. Consequently, the read buffer 254 is ready to receive the 15th word with no delay and the full bandwidth of the computer bus 12 is used. As soon as the second superword is loaded into the ram 256, 242, another Y component frame store access request is made and the process is repeated. This process continues until all of the commanded data bytes have been transferred from the disk file system to the frame store.

In the event that a block transfer is to be made in the other direction, the address command register 190 would be loaded to cause enable automatic increment on read rather than write. The disk file system 18 and computer bus 12 would place the Y component 66 address on the address lines along with a read command. Thereafter, the computer system would be required to wait for a short time interval until the first slice of a superword is read from the frame store and loaded into the read buffer registers 254, 240. As these registers are emptied by transfers of successive word pairs over the computer bus 12 and master bus 40 the subsequent slices of the first superword are stored in the superword rams 256, 242. As the last word of a superword is loaded into the read buffer 240, reading of the next superword from the Y frame store component 66 is requested and normally the first slice can be received and made available for transfer into the two read buffers 254, 240 before the two buffer words can be transferred over the master bus 40 and computer bus 12. Consequently, the data processing system can normally receive data at its maximum rate and fully utilize the bandwidth of computer bus 12 during a data read as well as a data write operation once the first data word has been received.

As with a data write operation, the address buffers 218, 220 drive the X and Y user address lines while X counter 208 is incremented by a count of 4 after every second word transfer over the buffered data bus to the master bus 40. This address in the X counter is incremented by a count of 4 for each 4 byte transfer so that at the end of a 24 byte superword, X counter 208 has been incremented by a count of 24 to indicate the beginning address of the next superword. Upon making a request for another superword transfer, this new address is transferred from the X and Y counters 208, 210 to the X and Y address buffers 218, 220. Furthermore, as explained previously, as soon as the X counter 208 exceeds the limit of the image field that is indicated by a comparison with the contents of the X limit register 200, the X counter 208 is reset and Y counter 210 is incremented. In the event that Y counter 210 becomes incremented beyond its image limit, further accesses to frame store 50 are inhibited while PATI 48 continues to receive transfers from the data processing system.

Figure 8:
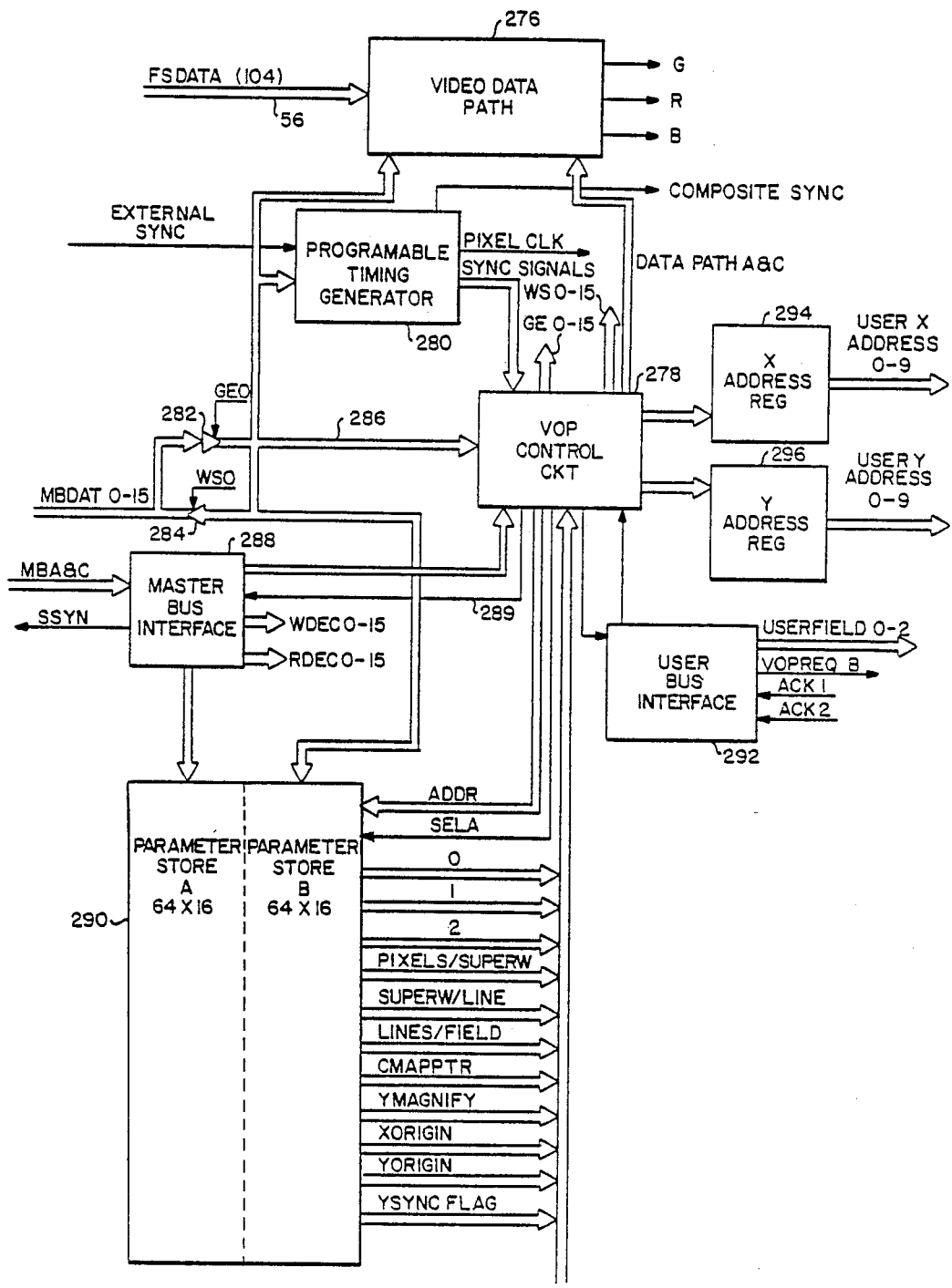
FIG. 8 is a block diagram representation of a video output processor shown in the video graphic system of FIG. 1.

Referring now to FIG. 8, the video output processor 42 receives superword slices of video data from frame store 50 over frame store data bus 56 and processes this video data in a video data circuit referred to as a video data path 276. A VOP control circuit 278 provides the timing and control signals for video output processor 42 including a plurality of data path address control signals which are communicated to data path 276. VOP control circuit 278 also provides gate enable signals GE0-15 and write strobe signals WS0-15 to control the loading of data registers and gating of data information. While the exact manner of generating these gating signals has not been shown, it will be appreciated that they may be conventionally generated to gate desired locations at appropriate times. A programmable timing generator 280 receives external synchronization signals if any and in return generates a composite sync signal, a pixel clock signal and various synchronization and timing signals for controlling video output processor control circuit 278. A preferred embodiment of programmable timing generator 280 is disclosed in application Ser. No. 139,332 (now U.S. Pat. No. 4,280,138) by Rodney D. Stock for FRAME PERIOD TIMING SIGNAL GENERATOR FOR RASTER SCAN VIDEO SYSTEM which is being filed simultaneously with the application for this patent and which is commonly assigned.

The data portion of the Master Bus, MBDATO-15 is communicated through bidirectional gates 282, 284 which are selectively gated by gating signals GE0 and WS0 respectively to provide communication with a buffered Master Bus data bus, BMBDATO-15 286. It will be appreciated that the video output processor 42 uses the same tristate gating complex as is used throughout the computer graphics system 10. A Master Bus interface circuit 288 provides address and control interface to the Master Bus by receiving Master Bus address and control signals and generating a system synchronization signal in return. Master Bus interface 288 provides control and timing signals to VOP control circuit 278 and generates decoded register and gate select outputs WDECO-15 and RDECO-15 in response to timing signal 289 and the decoding of Master Bus address signals.

A Master Bus parameter store 290 is implemented as a double store with components designated A and B. Each component is a 64 word×16 bit store and stores programmable VOP operating mode control information. A signal select A from VOP control circuit 278 determines whether or not the control circuit 278 responds to the A or B portion of parameter store 290. While the A portion is responsive to addressing by control circuit 278, the B portion may be addressed by the CPU 14 through the computer bus 12, Master Bus 40, buffered master data bus 286 and Master Bus interface 288. The 64 words of the unselected parameter store component become part of the address space of computer bus 12. This permits new parameters to be loaded into one component of parameter store 290 without affecting system operation. Upon loading a complete set of parameters, the VOP control circuit 278 can be commanded to switch the generator store component to which it responds to permit the new set of parameters to control video output processor 42 operation. This can be done at frame start time to avoid the generation of a jumbled picture. The use of the double parameter store 290 further avoids the problem of a video picture frame being partly responsive to old control parameters and partly responsive to new control parameters as a new set of control parameters is loaded over a period of time. In one example of use of parameter store 290, the store contains a number of constants which are useful to the control circuit 278, information indicating the number of pixels per superword which is 24 in this particular embodiment, information indicating the number of superwords per line which is 32 in this embodiment, information indicating the number of lines per field, which is 242.5 in this embodiment, a CMAPPTR signal, a Y magnify signal which indicates the degree of picture magnification in the Y direction, and X and Y origin signals which indicate the location within the frame store 50 video signal which is to become the upper lefthand corner of the output video picture. In the Y direction, magnification is accomplished by duplicating a line of information one, two, three or more times. Interlacing is accounted for to permit Y magnification of any number of frame lines. Data is received from the frame store a line at a time and stored in a double buffered line buffer from which it is repeated for Y magnification.

Without a relocation of the output display origin, the output video image would always place pixel location 0,0 as stored in the frame buffer 50 at the upper lefthand corner of the picture. As a result, as the image is magnified in the Y direction it would be expanded from top towards bottom and the bottom of the picture would be lost and as the image is expanded in the X direction it would expand from left towards right and the righthand portion of the picture would be lost. Consequently, magnification would always result in viewing only the upper lefthand corner of the video image as stored in the frame buffer. The X and Y origin data of parameter store 290 permits the output video signal to display any desired portion of a video image. By specifying X origin equals 48 and Y origin equals 25 the video output processor would use this pixel location as the upper lefthand corner of the output video image display and the portion to the right and below this new origin would be displayed to the extent that the magnification would permit.

A user bus interface circuit 292 exchanges synchronization signals with the VOP control circuit 278 and generates and receives the user bus control signals which are communicated with the picture address transform interface 48. These include the user field bits 0-2 which for video output processor 42 would always specify all of the frame store components which have been implemented in the particular arrangement of the system. The VOP request B signal is the second highest priority signal implemented in this system and the ACK1 and ACK2 signals are returned with the meaning which has previously been described. Ten bit X and Y address registers 294, 296 receive and latch X and Y address information for communication over the X and Y user address buses.

The video data path 276 is shown in greater detail in FIG. 9A and FIG. 9B for a single one of three color components of the video signal. Although the video data path 276 is shown in detail for only one of the components, this is deemed to be sufficient inasmuch as the paths for the other two components are identical except for minor modifications which will be apparent from the following description.

A double line buffer 300 receives and stores on a slice-at-a-time basis a complete line of video information. To avoid time delays, one portion of the double line buffer 300 provides a line of video information which is currently being displayed while the other half inputs from frame store 50 the next line of video information. When a new line of information is to be displayed, the rolls of the two double line buffer portions are switched with the new line of information being used to drive the display and a subsequent line of information being read into the other portion of the buffer. At any instant in time the two portions of the buffer appear to be operating independently.

Each portion of double line buffer 300 is a 256 word×32 bit memory which writes or reads out a 4 byte slice of a superword at one time. The 4 bytes of a slice from frame store 50 are communicated through multiplexers 302–305 which permit double line buffer 300 to selectively receive the 4 bytes of information from either frame store 50 in a normal manner or from the buffered Master Bus data bus for diagnostic and maintenance purposes.

While the double line buffer 300 outputs 32 bits in parallel, internal gating circuitry divides this into two serial words of 2 bytes each. A first or even byte is loaded into an even byte data register 308 while the next most significant byte is loaded into odd byte data register 310. For the IQ frame store component 68, even register 308 would receive an I component pixel byte while odd byte data register 310 would receive a Q component data byte. For the Y component frame store 66 or for any of the primary frame store color components in an RGB system the even and odd data registers 308, 310 would be loaded with even and odd address successive pixel video information. An address and control circuit 312 responds to data path address and control signals from VOP control circuit 278 to independently control the addressing and outputing of information from the two halves of the double line buffer 300. Address and control circuit 312 further generates a pixel clock at the rate of occurrence of successive pixels in the video display at a period of approximately 70 nanoseconds. The pixel clock is first divided by a selected number N indicated by commanded X mangification ratios to control the clocking of an address counter within address and control circuit 312. The loading of data into even byte and odd byte data registers 308, 310 is controlled by the next to least significant bit of this address counter. It will be appreciated that since two bytes are loaded in parallel into registers 308, 310, they need be reloaded only for every second pixel location. Internally of double line buffer 300, at the output section each pulse of the divided pixel clock 314 causes a transition between the upper and lower words of a 4 byte superword slice while each second occurrence causes an address increment to a new superword slice.

A gating network including tristate gates 316–319 provides for the selective gating of data stored by the even and odd byte data registers 308, 310 onto either a color map bus 320 or onto a color component data path 322 and 323.

The video data path is illustrated in FIG. 9 for the IQ components of a YIQ color system. In this arrangement gate 317 is continuously enabled through a switch 324 to continuously gate the output of even byte data register 308 onto I component data bus 322. Similarly, a switch 326 continuously enables gate 319 to continuously gate the output of odd byte data register 310 onto a Y component data bus 323 which is connected to gate 326 through a switch 328. It will be recalled that the even and odd byte data registers 308, 310 are reloaded only on alternate pixel clock signals. Consequently, duplicate bytes of pixel information are transferred over the odd component data bus 322 and the Q component data bus 323 before the video information is updated. This duplicating of I and Q component pixel information for successive pixels maintains the I and Q color components synchronized with a full color component at the pixel rate even though and I and Q color components are each stored with only half the bandwidth of a full color component signal.

Moving the switch 328 to the F or full color component position and changing switches 322 and 324 and 326 to their alternate positions causes gates 317 and 319 to be enabled in response to the noninverted and inverted outputs respectively from the least significant bit of the address counter within timing and control circuit 312. This arrangement corresponds to a full color component data path with the even byte and odd byte data register 308, 310 data contents being alternately loaded onto the I color component data path 322.

An IQ gate signal is applied to gates 331, 332 to alternately gate the contents of the even byte data register 308 and odd byte data register 310 onto the color map bus 320 under control of the least significant address bit. This arrangement permits a selected frame store component to drive the color map bus from which each of three color map stores may receive the color map bus data as address information to generate full three color video information in a color mapped mode of operation. A multiplexer 374 responds to a color map mode input signal to generate an 8 bit data output which represents either information appearing on the color map bus 320 or information appearing on I color component bus 322. In the described YIQ system, multiplexer 374 would in a normal mode respond to the I component color signal appearing on bus 322. The Q color component signal appearing on bus 323 would be communicated to a third multiplexer corresponding to multiplexer 374 with the remaining signal processing for the Q color component being substantially duplicative of that for the I color component which is shown in FIG. 9B. The Y color component would of course have its own separate frame store storage component and video path circuitry.

A pipeline definition register 336 is connected to be loaded by the central processing unit 14 in response to a decoded signal WDEC1 to designate the operating status of the video data path 276. Definition register 336 need not be duplicated for each color component. A color map mode output at a first bit position selectively enables the response of the video system to either data appearing on color map bus 320 or on a color component bus such as bus 322. An I, Q gate signal commands the selective gating of video information from the even byte and odd byte data registers 308, 310 onto the color component bus 320 as previously explained. Similar Y gate and B gate signals cause the selective gating of those color components onto the color map bus 320 when they are implemented. Signals force overlay, disable overlay and flip/substitute overlay control the response of the video signal to data from overlay component store 72 as described in more detail subsequently in conjunction with FIG. 9B.

Signal magnification in the X register is specified by encoded signals XMAG0 through XMAG3 to permit magnification with any factor between 1 and 16 inclusive. These signals are communicated to divide by N register 338 which divides the pixel clock signal by the designated number prior to presentation to the timing and control circuit 310. The divide by N circuit causes a selected number of repeats of pixel information, thereby expanding the video display in the X direction. Definitiion register 336 also generates an enable/blank signal which is utilized in the portion of the data path shown in FIG. 9B to selectively blank the entire output display.

An 8 bit maintenance register may be selectively loaded by CPU 14 as part of its address field in response to decoded loading signal WDEC3 and its output may be selectively gated onto color map bus 320 with signal RDEC3 for diagnostic and maintenance purposes. Neither maintenance register 342, address control register 312, divide by N circuit 338 nor divided by two circuit 340 need be repeated for each of the three color components.

Referring now to FIG. 9B the successive pixels of color component information are loaded into an 8 bit counter 344. Counter 344 serves as an address register for a 256 word×8 bit color map RAM 346 during a color map mode of operation. The color map 346 for each color component receives its address from the color map data bus and outputs a color component corresponding thereto. In a full color implementation, the color map RAM 346 outputs a color component signal which may be identical to its incoming address or alternatively may provide an adjustment for intensity nonlinearities in the incoming color component signal. An 8 bit output register 348 serves as an output data buffer for color map RAM 346 and is clocked at the pixel clock rate. The output of register 348 is selectively modified in accordance with the contents of the overlay frame store component 72 as well as other control signals.

It will be recalled that overlay frame store component 72 stores only one bit of information for each pixel location and that data is output 8 pixels at a time. Since only 3 bytes of information are required to define an overlay superword, the 3 bytes are placed on the superword data bus as 8 bit bytes but duplicated in pairs of 6 slice transfers. While the data input buffer portion of the video data path 276 for overlay store component 272 is somewhat different from the other components and has not been shown, it will be appreciated that the overlay store information can be loaded into a double input buffer and simultaneously gated at an output portion of the buffer to generate a serial bit stream of overlay data corresponding to the same pixel locations which are being addressed by the primary color components of the video data path 276.

This serial bit stream is received as an overlay input to an OR gate 348 which receives as a second input the forced overlay output of definition register 336 to override the overlay bit when enabled. The output of OR gate 348 is communicated to the input of an AND gate 350 which receives as a second input the inversion of the disable overlay signal generated by definition register 336. The output of AND gate 350 thus represents the overlay signal as modified by the force on and disable signals. This signal is communicated to an exclusive OR gate 352 which selectively inverts the most significant bit of the video data signal which is output by an 8 bit register 354. This selective inversion of the most significant bit of the color signal in response to the overlay signal assures a contrasting color when passed through a digital-to-analog converter. Alternatively, the controlled overlay signal is communicated as one input to an AND gate 356 which receives as a second input the inversion of flip overlay signal output from definition register 336. Under normal circumstances the flip overlay signal is at logic 1 causing the output of AND gate 356 to be disabled and thereby enabling a gate 358 through an inverter 360. This enables the normal data path through 8 bit register 354 with the most significant color component bit being selectively inverted by the controlled inversion signal. Alternatively however, the flip/substitute signal is at logic 0 to enable AND gate 356 and cause the enabling of a gate 362 whenever the controlled overlay signal is present. Under this circumstance data which is previously written into 8 bit register 364 as part of the address base of central processing unit 14 is gated to the A input of a multiplexer 366 in place of the output from gate 358. Even with AND gate 356 enabled, normal data is communicated to multiplexer 366 through gate 358 in the absence of a logic 1 overlay control bit. Multiplexer 366 selectively provides the gated video signal as previously defined or a logic 0 video blanking signal in response to the enable/blank output signal from definition register 336. The output of multiplexer 366 is communicated to a digital-to-analog converter 368 and is selectively gated onto the buffered Master Bus data bus through a gate 370 in response to a gating signal RDEC6.

The output of digital-to-analog converter 368 is successively passed through an amplifier 371, a low pass filter 372, a YIQ to RGB transformation matrix 374, a gamma correction filter 376 and an output driver 378 to generate the Y component of the video signal.

It will be appreciated that the other components of the color signal may be similarly developed and that the specific values of filters and component transforms may depend upon the particular video system that is implemented and the desired characteristics of the video output signal.

While there have been disclosed particular arrangements of a computer graphics system in accordance with the invention for the purpose of enabling a person of ordinary skill in the art to make and use the invention, it will be appreciated that the invention is not limited thereto. Accordingly, any modifications, variations, or equivalent arrangements within the scope of the attached claims should be considered to be within the scope of the invention.

What is claimed is:

1. A video processing system for a computer graphics system comprising:

a frame store means storing video information for each pixel in a coordinate matrix of pixels for a visual display, the frame store means having a first component store storing intensity information for each pixel of the visual display with a given resolution and a second component store storing color defining information for two color components of the visual display which are defined at half as many pixels as are stored by the first component store, each stored pixel of color defining information for each of the two color components having the given resolution;

a memory controlling means coupled to receive visual display coordinate matrix information and address the frame store means in response thereto to produce selected read and write operations;

an interface circuit means coupled to transfer video information between a data processing system and addressed frame store means pixel storage locations, the interface circuit means being coupled to communicate data processing system produced coordinate matrix pixel address information to the memory controlling means and transfer video information with the frame store means at pixel locations identified thereby; and a video output processing means coupled to provide coordinate matrix pixel address information to the memory controlling means in a sequence defining a raster scan video display and to receive color video display defining information from the frame store means in response thereto, the video output processing means including transformation circuitry for converting the video display defining information to at least one color output signal having a format that is acceptable by a video display device with the intensity of the color output signal being determined in response to data received from the first component store and the color content of the color output signal being determined in response to data received from the second component store.

2. A computer graphics system comprising:

a frame store means having a plurality of components, each component storing video information for all pixels of a raster scan display, transferring video information over a separate multi-pixel data bus, being addressable to read and write pixel data in multi-pixel superwords and being addressable at an individual pixel level to write video information for any selected single pixel;

an input scanning means means including a video signal input circuit coupled to receive a raster scan video signal, and analog-to-digital converter coupled to receive the video signal and convert the video signal to a sequence of digital values with each digital value representing one pixel of video information, a two dimensional address circuit coupled to generate addresses for the frame store means to properly locate the pixels of video information in a two dimensional array, and a data buffer coupled to receive the pixels of digital video information from the analog-to-digital converter and make multi-pixel parallel video information transfers to the frame buffer over the multipixel data bus in correspondence with the generation of address information locating the pixels in a two dimensional picture frame;

a video output processing means coupled to generate two dimensional address information identifying pixels of video information in a frame of a raster can display, a data buffer coupled to receive pixels of video data over the multi-pixel data bus in response to the generated address information and output the pixels of information as a sequence of digital information in raster scan order, and a digital-to-analog converter coupled to receive the sequence of digital pixel information and generate a raster scan video signal in response thereto;

a picture address transform interface circuit means coupled to receive requests from a data processing system for the transfer of pixels of video information at locations specified by a two dimensional address and to access the frame store means at locations identified by the address to transfer information between the frame store means and the picture address transform interface circuit means over the multi-pixel data bus and to transfer information between the picture address transform interface circuit means and the data processing system; and a memory controlling means coupled to receive two dimensional pixel addresses and transform said addresses into addresses matching the requirements of frame store means storage elements and to control the transfer of data over the multi-pixel data bus between the frame store means and the input scanning means, the video output processing means and the picture address transform interface circuit means.

3. A computer graphics system including a video processing system that is connectable for communication with a data processing system, the video processing system comprising:

a frame store means storing color video display information defining pixels of a video display as a component of luminance information and two components of chrominance information with a third component of chrominance information being determinable from said color video display information, each of said two components of chrominance information having a resolution less than the by resolution of the luminance information and being defined by a fewer number of bits per pixel than the luminance component; and a video output processor means coupled to receive said pixels of a video display from the frame store means and including means for converting said pixels of a video display to output pixels having a color television video signal digital representation with each component being represented by an equal number of said output pixels, and means for outputting said output in a raster scan order.

4. The computer graphics system according to claim 3 above wherein said output pixels define a video signal component of a composite video television signal in interlaced raster scan order.

5. The computer graphics system according to claim 4 above, wherein the video processing system further comprises a red, green, blue color monitor and the video output processor means includes a transform converting the color video display information to a red, green, blue color format that is compatible with the color monitor.

6. The computer graphics system according to claim 3 above wherein the color video display information is stored with the luminance and chrominance components having the same dynamic range and with the luminance component having twice the spatial resolution of the chrominance components.

7. The computer graphics system according to claim 3, 4 or 6 above, wherein the color video display information is stored in a television YIQ color representation.

8. The computer graphics system according to claim 7 above, wherein the video output processor means receives from the frame store means color video display information defining each pixel by an eight bit byte for each stored component thereof.

9. A computer graphics system comprising:

a data processing system including a CPU, a computer bus, and a plurality of data processing system components connected to the CPU by the computer bus; and a video processing system including:

a master bus;

a master bus interface means connected between the master bus and the computer bus and controlling the master bus substantially as an extension of the computer bus in response to addresses appearing on the computer bus which relate to storage locations within the video processing system;

a frame store means storing a frame of video information at addressable locations therein;

a memory controlling means coupled to receive frame store means access requests and provide to the frame store means address and control information controlling data transfers to and from the frame store means, the memory controlling means having therein at least one readable and at least one writable register connected for communication with the data processing system over the master bus;

an interface circuit means coupled to the frame store means, memory controlling means and master bus to provide communication of video information between the data processing system and the frame store means, the interface circuit means having a least one readable and at least one writable register connected for communication with the data processing system over the master bus;

and a video output processing means coupled to the frame store means and memory controlling means to receive video information from the frame store means and output the video information received from the frame store means in raster scan order, the video output processing means having therein at least one readable and one writable register connected for communication with the data processing system over the master bus.

10. A computer graphics system according to claim 9 above, wherein the video processing system further includes an input scanning means coupled to the master bus, the memory controlling means and the frame store means, the input scanning means including a television camera and providing video data to the frame store means for storage therein, the input scanning means having therein at least one readable and at least one writable register connected for communication with the data processing system over the master bus.

11. A computer graphics system according to claim 9 above, wherein the at least one readable and at least one writable register of the interface circuit means includes an X limit register defining a video boundary in a horizontal dimension and a Y limit register defining a video boundary in a vertical dimension and wherein the interface circuit means includes a circuitry inhibiting access to the frame store means at locations outside of the defined boundaries.

12. A computer graphics system according to claim 11, wherein the memory controlling means receives pixel addresses in a two dimension coordinate matrix and includes an address translator converting said addresses to a linear address field.

13. A computer graphics system according to claim 11 above, wherein the at least one readable and at least one writable register of the interface circuit means includes an X address counter and a Y address counter for storing pixel addresses for the storage of video data in the frame store means, the X and Y address counters being automatically incremented under predetermined conditions during block transfers of data with the data processing system to control the proper accessing of the frame store means without the transfer from the data processing system of a pixel address for each accessed pixel location in the frame store means.

14. A computer graphics system comprising:
a data processing system having a central processing unit, a plurality of peripheral units and a computer bus interconnecting the central processing unit and the plurality of 5 peripheral units;
a master bus coupled to the computer bus and operating substantially as an extension of the computer bus for a selected field of address locations;
an address bus carrying picture frame address information indicating the location of a pixel within a frame;
a video data bus carrying video information representing pixels within a picture frame;
a frame store means storing at least one frame of video information and coupled to communicate video information over the video data bus in response to commands from a memory controlling means;
a memory controlling means coupled to receive frame store means access requests and associated pixel addresses over the address bus, the memory controlling means granting the address requests on a priority basis with each requesting unit having a predetermined priority, the memory controlling means being further coupled to communicate to the frame store means control and address information related to a granted frame store means access request causing the frame store means to communicate video information over the video data bus with the access requesting unit receiving a grant of an access request; and
a video output processing means coupled to provide frame store means access requests and addresses to the memory controlling means over the address bus and to communicate video data over the video data bus with the frame store means upon the granting of an access request to the video output processing means, the video output processing means having addressable control registers coupled to receive control information from the data processing system over the master bus and being operative to output video information in raster scan order in response to the control information.

15. The computer graphics system according to claim 14 above, wherein the memory controlling means receives two dimensional coordinate matrix addresses over the address bus and includes an address transformer coupled to convert said two dimensional coordinate matrix addresses to corresponding linear addresses which are communicated to the frame store means.

16. The computer graphics system according to claim 15 above, further comprising a data tablet sensing the position of a data pen thereon, generating digital representations of data pen positions and coupled to the computer bus to communicate digital representations of a data pen position to the data processing system over the computer bus.

17. The computer graphics system according to claim 14, 15 or 16 above, further comprising a display coupled to the computer bus to receive digital representations of visual characters from the data processing system and display the visual characters corresponding to received digital representations.

18. The computer graphics system according to claim 15 above, further comprising an interface circuit means coupled to the master bus, to the video data bus and to the address bus to provide communication of video information between the data processing system and the frame store means.

19. The computer graphics system according to claim 18 above, wherein the interface circuit means includes first, second and third registers which are addressable within the address space of the data processing system carried by the computer bus, the first register storing a first coordinate address of a two dimensional coordinate matrix address, the second register storing a second coordinate address of the two dimensional coordinate matrix address and the third register storing video data, the interface circuit means communicating video data between the third register and the data processing system over the master bus and computer bus, communicating frame store means access requests and address information stored in the first and second registers to the memory controlling means, and communicating video data over the video data bus with the frame store means upon the granting by the memory controller of an access request from the interface circuit means, the interface circuit means providing a coupling between the third register and the video data bus of video information communicated over the video data bus.

20. The computer graphics system according to claim 18 or 19 above, wherein the interface circuit means includes a control circuit providing a block mode of video data transfer between the data processing system and the frame store means with the interface circuit receiving from the data processing system a starting video frame address, with the interface circuit means communicating successive transfers of video data with the data processing system at a storage location that is accessible to the data processing system as a single, constant address location, and with the interface circuit means communicating succcessive transfers of the video data with the frame store means and stepping the starting video frame address as successive transfers are made to the frame store means to cause the address communicated to the memory controlling means to always correspond to data being communicated between the interface circuit means and the frame store means.

21. The computer graphics system according to claim 20 above, wherein the data processing system includes a peripheral storage device coupled to the computer bus and including an address counter which is incrementally stepped in response to an increment signal, a writable control store having an address location in the computer bus address space and a gating circuit repsonsive to a bit location in the writable control store for selectively disabling the increment signal during a block transfer of video data in response to the storage of a disable bit in the bit location to cause the address counter of the peripheral device to indicate a single, constant address location during a block transfer of video data between the peripheral storage device and the interface circuit means.

22. The computer graphics system according to claim 14 or 15 above, further comprising an input scanning means coupled to communicate video frame address information and frame store means access requests over the address bus to the memory controlling means and video data over the video data bus to the frame store means upon the granting of an access request made by the input scanning means, the input scanning means including a video camera generating the video data for transfer from the input scanning means to the frame store means.

23. The computer graphics system according to claim 22 above, wherein the video data bus has sufficient bandwidth to support the concurrent communication of video data between the input scanning means and the frame store means and between the video output processing means and the frame store means at sufficient rates for NTSC color television signals to permit frames of video data generated by the input scanning means to be output by the video output processing means on a continuous real time basis.

24. The computer graphics system according to claim 23 above, wherein the video data bus comprises exactly 104 individual, parallel conductors.

25. The computer graphics system according to claim 22 above, wherein the input scanning means further includes at least one readable and at least one writable storage location coupled to the computer bus through the master bus and having an address within the address field of the computer bus.

26. The computer graphics system according to claim 25 above, wherein said at least one readable and at least one writable storage location included in the input scanning means includes a transformation memory for each component of a video output signal generated by the video camera, each transformation memory receiving a different video signal component as an address input and generating an output in response thereto, each transformation memory storing data selected to provide a desired functional transformation between the input and output thereof.

27. The computer graphics system according to claim 26 above, wherein said each component of a television signal includes Y, I and Q components of an NTSC color television signal.

28. A video processing system comprising an input scanning means generating an internal three component color video signal for transfer on a video data bus, a frame store means storing a frame of video data for each component of a three component color video signal, a video output processing means providing as an output an external three component color video signal for use by a video display device, and the video data bus interconnecting the video output processing means, input scanning means and frame store means for each color video signal component with each transfer of video data between the input scanning means, and video output processor means over the video data bus occurring as a superword with a plurality of sequential 32 bit transfers for each color video signal component.

29. The video processing system according to claim 28 above, wherein each superword video data transfer includes exactly six sequential 32 bit transfers for each color component transferred.

30. The video processing system according to claim 29 above, wherein each superword represents 24 pixels of video data.

31. A video processing system for a computer graphics system having a data processing system, the video processing system comprising a video data bus having a sufficient number of conductors to carry simultaneously a barrel of video data for each component of a color video signal, each barrel including a plurality of pixels; a frame store means coupled to the video data bus and storing at least one frame of video data, a video output processing means coupled to the video data bus to output in raster scan order successive frames of video data received over the video data bus for display by a video display device, and an interface circuit means coupled to the video data bus and to the data processing system to provide communication of video data between the frame store means and the video processing system, the frame store means and video output processing means each including video data bus interface circuitry coupled to communicate video data on the video data bus as individual superwords, each superword comprising a plurality of barrels of video data for each component of a color video signal, with each said component being transferred in parallel as a rapid, uninterrupted sequence of barrel transfers.

32. The video processing system according to claim 31 above, further comprising an input scanning means generating frames of video data and including interface circuitry coupled to communicate over the video data bus in superword transfers of video data.

33. The video processing system according to claim 31 or 32 above, wherein each pixel of video data is represented by an eight bit byte for each component, wherein each barrel contains four bytes and wherein each superword contains six barrels for each video signal component.

34. A computer graphics video processing system comprising first and second buses coupled to carry respectively video information and address and control information between elements of the video processing system with sufficient bandwidth to concurrently accommodate two television video signals, a frame store means element storing at least one frame of video information and coupled to communicate video information over the first bus upon command, a memory controlling means element coupled to command the transfer of video information by the frame store means in response to address and control information received over the second bus from an element, a video output processing means element coupled to communicate address and control information over the second bus and video information over the first bus to successively output in raster scan order a frame of video information stored in the frame store means element and an input scanning means element coupled to communicate address and control information over the second bus and video information over the first bus to successively input to the frame store means in raster scan order a frame of video information, the frame store means having sufficient bandwidth to accommodate concurrent accesses by both the input scanning means element and the video output processing means element at television video data rates.

35. A computer graphics system having a data processing system and a video processing system coupled for communication with the data processing system, the video processing system including a frame store means having a plurality of frame store means memory components, each component having sufficient capacity to store a frame of video information for a component of a video signal, an interface circuit means coupled to communicate video data between the data processing system and a memory component of the frame store means designated by the data processing system and a video output processing means coupled to receive frames of video data from the frame store means and output the video data in raster scan order for use by a video display device, the video output processing means being selectively switchable to operate in a selected one of a monochrome mode in which luminance video data is received from a first memory component of the frame store means and a Y, I, Q mode in which luminance video data is received from a first memory component of the frame store means and chrominance information is received from a second memory component of the frame store means with the chrominance information including two video components stored in the second memory component with half the spatial resolution of the luminace video data, the video output processing means including a converter circuit coupled to convert the luminance data and chrominance information into a color television video signal.

36. The computer graphics system according to claim 35 above, wherein the video processing system further comprises an input scanning means coupled to scan a video image and provide to the frame store means digital video data representative of the scanned image, the input scanning means being selectively switchable to operate in a selected one of a monochrome mode in which luminance video data is communicated to the frame store means and a Y, I Q mode in which luminance video data is communicated to the first memory component of the frame store means and chrominance information is communicated to the second memory component of the frame store means with the chrominance information including two video components stored in the second memory component with half the spatial resolution of the luminance video data.

37. The computer graphics system according to claim 35 above, wherein the frame store means has three memory components, each storing a different video component of a color video signal and wherein the video output processing means is further selectively switchable to a three color mode in which three video components of a color video signal are received respectively from three memory components of the frame store means, the three video components being stored with equal dynamic and spatial resolution.

* * * * *

UNITED STATES PATENT AND TRADEMARK OFFICE
CERTIFICATE OF CORRECTION

PATENT NO. : 4,564,915

DATED : January 14, 1986

INVENTOR(S) : Lawrence J. Evans, et al

It is certified that error appears in the above-identified patent and that said Letters Patent is hereby corrected as shown below:

Column 4, line 57, "furture" should read --future--.

Column 5, line 5, "scane" should read --scan--.

Column 5, line 26, "momochrome" should read --monochrome--.

Column 8, line 36, "108" should read --109--.

Column 13, line 17, "generator 194." should read --generator 194 indicating a two dimensional video image spatial address--.

Column 19, line 25, "generator store" should read --parameter store--.

Column 21, line 21, "322 and 323." should read --322 or 323.--

Column 25, line 14, "can display" should read --scan display--.

Signed and Sealed this

Twenty-seventh Day of May 1986

[SEAL]

Attest:

DONALD J. QUIGG

Attesting Officer

Commissioner of Patents and Trademarks